(12) United States Patent
Hertzmann et al.

(10) Patent No.: US 12,417,558 B2
(45) Date of Patent: Sep. 16, 2025

(54) GENERATING STYLIZED DIGITAL IMAGES VIA DRAWING STROKE OPTIMIZATION UTILIZING A MULTI-STROKE NEURAL NETWORK

(71) Applicant: Adobe Inc., San Jose, CA (US)

(72) Inventors: Aaron Phillip Hertzmann, San Francisco, CA (US); Manuel Rodriguez Ladron de Guevara, Pittsburgh, PA (US); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 424 days.

(21) Appl. No.: 17/556,716

(22) Filed: Dec. 20, 2021

(65) Prior Publication Data

US 2023/0196630 A1  Jun. 22, 2023

(51) Int. Cl.
*G06T 11/00* (2006.01)
*G06N 3/045* (2023.01)
*G06N 3/084* (2023.01)
*G06V 10/40* (2022.01)

(52) U.S. Cl.
CPC ............. *G06T 11/00* (2013.01); *G06N 3/045* (2023.01); *G06N 3/084* (2013.01); *G06V 10/40* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS 10,643,130 B2 * 5/2020 Fidler .................. G06V 10/774
2022/0156987 A1 * 5/2022 Chandran .............. G06N 3/047
(Continued)

OTHER PUBLICATIONS

Reimann, Max, et al. Interactive Multi-Level Stroke Control for Neural Style Transfer. arXiv:2106.13787, arXiv, Jun. 25, 2021. arXiv.org, https://doi.org/10.48550/arXiv.2106.13787. (Year: 2021).*
(Continued)

*Primary Examiner* — Matthew C Bella
*Assistant Examiner* — Johnny B Duong
(74) *Attorney, Agent, or Firm* — Keller Preece PLLC

(57) ABSTRACT

Methods, systems, and non-transitory computer readable storage media are disclosed for utilizing a multi-stroke neural network for modifying a digital image via a plurality of generated stroke parameters in a single pass of the neural network. Specifically, the disclosed system utilizes an encoder neural network to generate an encoding of a digital image. The disclosed system then utilizes a decoder neural network that generates a sequence of stroke parameters for digital drawing strokes from the encoding in a single pass of the encoder neural network and decoder neural network. Additionally, the disclosed system utilizes a renderer neural network to render the digital drawing strokes on a digital canvas according to the sequence of stroke parameters. In additional embodiments, the disclosed system utilizes a balance of loss functions to learn parameters of the multi-stroke neural network to generate stroke parameters according to various rendering styles.

20 Claims, 13 Drawing Sheets

(56) References Cited

U.S. PATENT DOCUMENTS

2023/0074420 A1* 3/2023 Yin .................... G06T 3/18
2024/0095972 A1* 3/2024 Zhang ............... G06F 16/5866

OTHER PUBLICATIONS

Mihai, Daniela, and Jonathon Hare. Differentiable Drawing and Sketching. arXiv:2103.16194, arXiv, Jul. 19, 2021. arXiv.org, https://doi.org/10.48550/arXiv.2103.16194. (Year: 2021).*

Kotovenko, Dmytro, et al. "Rethinking style transfer: From pixels to parameterized brushstrokes." Proceedings of the IEEE/CVF Conference on Computer Vision and Pattern Recognition. 2021. (Year: 2021).*

Xie, Ning, et al. "Stroke-based stylization by learning sequential drawing examples." Journal of Visual Communication and Image Representation 51 (2018): 29-39. (Year: 2018).*

Singh, Jaskirat, et al. "Intelli-paint: Towards developing human-like painting agents." arXiv preprint arXiv:2112.08930 (2021). (Year: 2021).*

Kerdreux, Thomas, Louis Thiry, and Erwan Kerdreux. "Interactive neural style transfer with artists." arXiv preprint arXiv:2003.06659 (2020). (Year: 2020).*

Pierre Benard and Aaron Hertzmann. Line drawings from 3D models. Foundations and Trends in Computer Grapics and Vision, 11(1-2), 2019.

D. Berio, S. Calinon, and F. Fol Leymarie. Learning dynamic graffiti strokes with a compliant robot. In Proc. IEEE/RSJ Intl Conf. on Intelligent Robots and Systems (IROS), Dae-jeon, Korea, Oct. 2016.

Yang Chen, Yu-Kun Lai, and Yong-Jin Liu. Cartoongan: Generative adversarial networks for photo cartoonization. In Proceedings of the IEEE conference on computer vision and pattern recognition, pp. 9465-9474, 2018.

Yaroslav Ganin, Tejas Kulkarni, Igor Babuschkin, SM Ali Eslami, and Oriol Vinyals. Synthesizing programs for images using reinforced adversarial learning. In International Conference on Machine Learning, pp. 1666-1675. PMLR, 2018.

Ian J. Goodfellow, Jean Pouget-Abadie, Mehdi Mirza, Bing Xu, David Warde-Farley, Sherjil Ozair, Aaron Courville, and Yoshua Bengio. Generative Adversarial Nets. In Proc. Neural Information Processing Systems, 2014.

Stephane Grabli, Emmanuel Turquin, Fredo Durand, and Francois X Sillion. Programmable rendering of line drawing from 3d scenes. ACM Transactions on Graphics (TOG), 29(2):1-20, 2010.

David Ha and Douglas Eck. A neural representation of sketch drawings. arXiv preprint arXiv:1704.03477, 2017.

Paul Haeberli. Paint By Numbers: Abstract Image Representations. In Proc. SIGGRAPH, 1990.

Kaiming He, Xiangyu Zhang, Shaoqing Ren, and Jian Sun. Deep residual learning for image recognition. CoRR, abs/1512.03385, 2015.

Aaron Hertzmann. Painterly Rendering with Curved Brush Strokes of Multiple Sizes. In Proc. SIGGRAPH, 1998.

Aaron Hertzmann. Paint by relaxation. In Proc. CGI, 2001.

Aaron Hertzmann. A Survey of Stroke-Based Rendering. IEEE Computer Graphics & Applications, 23(4), 2003.

Zhewei Huang, Wen Heng, and Shuchang Zhou. Learning to paint with model-based deep reinforcement learning, 2019.

Biao Jia, Jonathan Brandt, Radomir Mech, Byungmoon Kim, and Dinesh Manocha. Lpaintb: Learning to paint from self-supervision. In Proc. Pacific Graphics, 2019.

Junhwan Kim and Fabio Pellacini. Jigsaw image mosaics. ACM Transactions on Graphics, 21(3):657-664, 2002.

Diederik P Kingma and Max Welling. Auto-encoding variational bayes. arXiv preprint arXiv:1312.6114, 2013.

Tzu-Mao Li, Michal Lukac, Michael Gharbi, and Jonathan Ragan-Kelley. Differentiable vector graphics rasterization for editing and learning. ACM Trans. Graph., 39(6), 2020.

Peter Litwinowicz. Processing Images and Video for an Impressionist Effect. In Proc. SIGGRAPH, 1997.

Songhua Liu, Tianwei Lin, Dongliang He, Fu Li, Ruifeng Deng, Xin Li, Errui Ding, and Hao Wang. Paint transformer: Feed forward neural painting with stroke prediction. In Proceedings of the IEEE/CVF International Conference on Computer Vision (ICCV), pp. 6598-6607, Oct. 2021.

Ziwei Liu, Ping Luo, Xiaogang Wang, and Xiaoou Tang. Deep learning face attributes in the wild. In Proceedings of International Conference on Computer Vision (ICCV), Dec. 2015.

John F. J. Mellor, Eunbyung Park, Yaroslav Ganin, Igor Babuschkin, Tejas Kulkarni, Dan Rosenbaum, Andy Ballard, Theophane Weber, Oriol Vinyals, and S. M. Ali Eslami. Unsupervised doodling and painting with improved spiral, 2019. arXiv:1910.01007.

Haoran Mo, Edgar Simo-Serra, Chengying Gao, Changqing Zou, and Ruomei Wang. General virtual sketching frame-work for vector line art. ACM Transactions on Graphics (Proceedings of ACM SIGGRAPH 2021), 40(4):51:1-51:14, 2021.

Paul Rosin and John Collomosse. Image and Video-Based Artistic Stylisation. Springer, 2013.

Peter Schaldenbrand and Jean Oh. Content masked loss: Human-like brush stroke planning in a reinforcement learning painting agent. InProc. AAAI, 2021.

Adrian Secord. Weighted voronoi stippling. In Proceedings of the 2nd international symposium on Non-photorealistic animation and rendering, pp. 37-43, 2002.

Karen Simonyan and Andrew Zisserman. Very deep convolutional networks for large-scale image recognition.arXiv preprint arXiv:1409.1556, 2014.

Jaskirat Singh and Liang Zheng. Combining semantic guidance and deep reinforcement learning for generating human level paintings. In Proceedings of the IEEE/CVF Conference on Computer Vision and Pattern Recognition, pp. 16387-16396, 2021.

Richard Zhang, Phillip Isola, Alexei A Efros, Eli Shechtman, and Oliver Wang. The unreasonable effectiveness of deep features as a perceptual metric. InProc. CVPR, 2018.

Ningyuan Zheng, Yifan Jiang, and Dingjiang Huang. Strokenet: A neural painting environment. In International Conference on Learning Representations, 2019.

Jun-Yan Zhu, Taesung Park, Phillip Isola, and Alexei A Efros. Unpaired image-to-image translation using cycle-consistent adversarial networks. In Computer Vision (ICCV), 2017 IEEE International Conference on, 2017.

Zhengxia Zou, Tianyang Shi, Shuang Qiu, Yi Yuan, and Zhenwei Shi. Stylized neural painting. In Proceedings of the IEEE/CVF Conference on Computer Vision and Pattern Recognition (CVPR), pp. 15689-15698, Jun. 2021.

Tao Zhou, Chen Fang, Zhaowen Wang, Jimei Yang, Byungmoon Kim, Zhili Chen, Jonathan Brandt, and Demetri Terzopoulos. Learning to sketch with deep q networks and demonstrated strokes. arXiv preprint arXiv:1810.05977, 2018.

Ning Xie, Hirotaka Hachiya, and Masashi Sugiyama. Artist agent: A reinforcement learning approach to automatic stroke generation in oriental ink painting. IEICE Transactions on Information and Systems, 96(5):1134-1144, 2013.

* cited by examiner

GENERATING STYLIZED DIGITAL IMAGES VIA DRAWING STROKE OPTIMIZATION UTILIZING A MULTI-STROKE NEURAL NETWORK

BACKGROUND

Recent years have seen significant advancements in hardware and software platforms used for generating digital imagery via machine-learning. Many industries utilize machine-learning techniques to automatically generate or modify digital images for a variety of uses such as digital image stylization or dataset generation/augmentation. For example, some industries provide tools for users to quickly and easily modify digital images (e.g., photographs) in a variety of different ways to imitate specific visual styles to use in graphic design, art, advertising, photographic manipulation, and editing personal photos. Accurately representing/stylizing digital image content according to specific styles, however, can be a difficult task. Conventional systems suffer from a number of shortcomings with regard to efficiently and accurately modifying digital images according to a number of different stylistic reconstructions.

SUMMARY

This disclosure describes one or more embodiments of methods, non-transitory computer readable media, and systems that solve the foregoing problems (in addition to providing other benefits) by utilizing a multi-stroke neural network for modifying a digital image via a plurality of generated stroke parameters in a single pass of the neural network. The disclosed systems utilize the multi-stroke neural network to stylize digital images by redrawing (e.g., digitally painting) the digital images according to a sequence of digital drawing strokes. Specifically, the disclosed systems utilize an encoder neural network to generate an encoding of a digital image. The disclosed systems then utilize a decoder neural network that generates a sequence of stroke parameters for digital drawing strokes from the encoding in a single pass of the encoder neural network and decoder neural network. Additionally, the disclosed systems utilize a renderer neural network to render the digital drawing strokes on a digital canvas according to the sequence of stroke parameters. In additional embodiments, the disclosed systems utilize a balance of loss functions to learn parameters of the multi-stroke neural network to generate stroke parameters according to various rendering styles. The disclosed systems thus utilize a multi-stroke neural network to efficiently, accurately, and flexibly render a plurality of strokes for stylizing a digital image.

BRIEF DESCRIPTION OF THE DRAWINGS

Various embodiments will be described and explained with additional specificity and detail through the use of the accompanying drawings in which.

DETAILED DESCRIPTION

Figure 1:
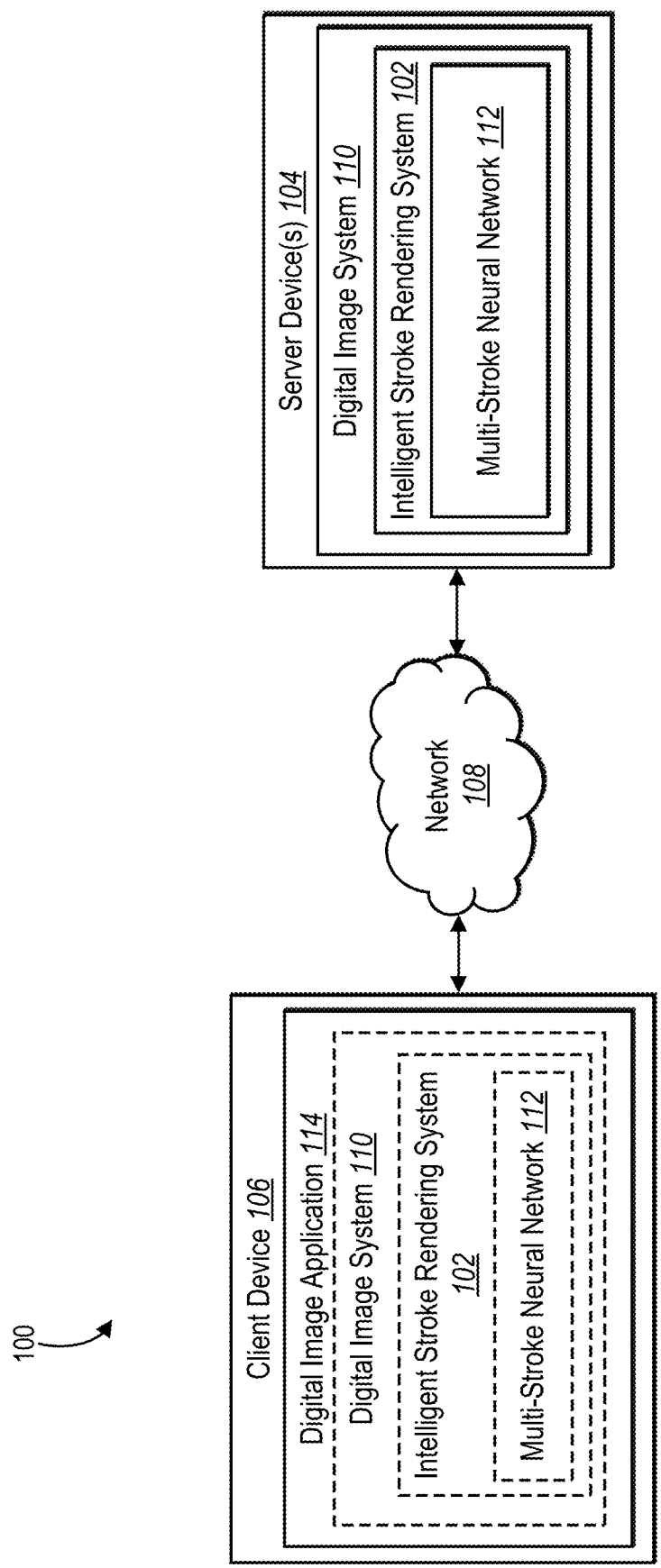
FIG. 1 illustrates an example system environment in which an intelligent stroke rendering system can operate in accordance with one or more implementations.

This disclosure describes one or more embodiments of an intelligent stroke rendering system that generates a sequence of strokes for stylizing a digital image via a single pass of a multi-stroke neural network. In one or more embodiments, the intelligent stroke rendering system utilizes an encoder neural network to encode feature maps of a digital image. Additionally, the intelligent stroke rendering system utilizes a decoder neural network to generate feature representations for a sequence of stroke parameters for a plurality of digital drawing strokes from the encoding. The intelligent stroke rendering system then utilizes a renderer neural network to render the digital drawing strokes on a digital canvas based on the feature representations according to the sequence of stroke parameters. In one or more embodiments, the intelligent stroke rendering system also utilizes a combination of a plurality of losses to train the multi-stroke neural network to generate sequences of stroke parameters according to various rendering styles. The intelligent stroke rendering system thus utilizes an efficient multi-stroke neural network that stylizes a digital image by redrawing the digital image according to a sequence of learned digital drawing strokes.

As mentioned, in one or more embodiments, the intelligent stroke rendering system utilizes an encoder neural network to encode visual information of a digital image. For example, the intelligent stroke rendering system utilizes an encoder neural network including one or more convolutional neural network layers to encode features of the digital image. Specifically, the intelligent stroke rendering system utilizes the encoder neural network to generate an encoding of the digital image including feature maps representing the features of the digital image.

Additionally, in one or more embodiments, after generating an encoding of a digital image, the intelligent stroke rendering system utilizes a decoder neural network to generate stroke parameters for a plurality of digital drawing strokes. In particular, the intelligent stroke rendering system utilizes a decoder neural network including one or more fully-connected neural network layers and/or a long short-term memory neural network layer to generate a plurality of digital drawing strokes. For instance, the intelligent stroke rendering system utilizes the decoder neural network to generate feature representations for a sequence of stroke parameters according to an order for rendering the plurality of digital drawing strokes within a digital canvas. The intelligent stroke rendering system also generates the sequence of stroke parameters via a single pass of the decoder neural network After generating a sequence of stroke parameters, the intelligent stroke rendering system renders a plurality of strokes within a digital canvas. Specifically, the intelligent stroke rendering system utilizes a renderer neural network to render the feature representations corresponding to the sequence of stroke parameters within the digital canvas. The intelligent stroke rendering system thus generates a plurality of instances of the digital canvas by sequentially rendering each digital drawing stroke onto the digital canvas according to the sequence of the corresponding stroke parameters.

In one or more additional embodiments, the intelligent stroke rendering system also utilizes a plurality of losses to reconstruct a digital image (e.g., stylize via rendering of a plurality of learned individual digital drawing strokes) according to a particular rendering style. To illustrate, the intelligent stroke rendering system determines a greedy loss, a sparse loss, and/or a one-off loss based on one or more instances of a digital canvas corresponding to one or more rendered digital drawing strokes. In some embodiments, the intelligent stroke rendering system also determines weights associated with the losses for training the multi-stroke neural network to render digital drawing strokes according to a selected rendering style. Furthermore, in some embodiments, the intelligent stroke rendering system trains a plurality of multi-stroke neural networks according to a plurality of different rendering styles.

As mentioned, conventional image processing systems have a number of shortcomings in relation to flexibility, efficiency, and accuracy of operation. For example, some conventional image stylizing systems utilize reinforcement learning models with adversarial learning for stylizing digital images. While such systems can provide precise strokes while stylizing digital images, these conventional systems are inefficient. Specifically, the conventional systems require many small strokes to reproduce the digital images, thus requiring significant processing time and resources. Some of the conventional systems also typically utilize a plurality of passes through a neural network to render the many small strokes (e.g., via parallel neural networks or iterative processes). Furthermore, these conventional systems are limited to a small number of digital rendering styles.

Other conventional image stylizing systems that utilize reinforcement learning (e.g., adversarially-trained actor-critic models) for reconstructing/stylizing digital images can provide image stylization over a range of different abstracted image styles are limited in accuracy. In particular, these conventional systems tend to produce results that are blurry and are unable to stylize digital images with fine detail. The conventional systems also provide little or no interpretable control over the rendering style or level of precision in the stylization process. Accordingly, in addition to being inefficient, conventional systems that utilize reinforcement learning typically experience trade-offs between accuracy and flexibility.

Some conventional image stylizing systems utilize differentiable reconstruction optimization by optimizing a stroke arrangement with gradient-based optimization. Such conventional systems can provide rendering style variation with different stroke parameterization and textures. These conventional systems, however, also require a large number of strokes (e.g., thousands) to reconstruct/redraw a digital image with fine-stroke effects. Furthermore, because the conventional systems utilize direct optimization, stylization is often slow and utilizes significant computing resources.

The disclosed intelligent stroke rendering system provides a number of advantages over conventional systems. For example, the intelligent stroke rendering system improves the efficiency of computing systems that reproduce digital images. Specifically, in contrast to conventional systems that generate a large number of strokes to reproduce digital images (e.g., via a plurality of passes through neural networks), the intelligent stroke rendering system generates a sequence of stroke parameters via a single pass of a multi-stroke neural network to reproduce a digital image while limiting the number of strokes relative to conventional systems. Accordingly, the intelligent stroke rendering system reproduces digital images with reduced computing resources and time compared to conventional systems.

The intelligent stroke rendering system also improves efficiency by utilizing a multi-stroke neural network with a lightweight architecture. Specifically, the intelligent stroke rendering system can utilize a decoder neural network with fully connected neural network layers and/or recurrent neural network layers (e.g., a long short-term memory neural network layer) to generate a sequence of stroke parameters in a single pass of the decoder neural network. By utilizing a multi-stroke neural network with a lightweight architecture, the intelligent stroke rendering system provides high-precision results with short and straightforward training, which results in utilizing fewer computing resources to train the multi-stroke neural network.

Furthermore, the intelligent stroke rendering system improves flexibility and accuracy of computing systems that reproduce digital images. In particular, while conventional systems are limited to reproducing limited rendering styles based on the stroke generation method, the intelligent stroke rendering system leverages the multi-stroke neural network to directly map a digital image to a collection of strokes. For example, the intelligent stroke rendering system utilizes a combination of a plurality of losses to provide different rendering styles. More specifically, the intelligent stroke rendering system balances the losses to reconstruct digital images (e.g., redraw the digital images utilizing learned stroke parameters for a plurality of digital drawing strokes) at different levels of abstraction or detail while still providing accurate reproductions.

Turning now to the figures, FIG. 1 includes an embodiment of a system environment 100 in which an intelligent stroke rendering system 102 is implemented. In particular, the system environment 100 includes server device(s) 104 and a client device 106 in communication via a network 108. Moreover, as shown, the server device(s) 104 include a digital image system 110, which includes the intelligent stroke rendering system 102. As further illustrate in FIG. 1, the intelligent stroke rendering system 102 includes a multi-stroke neural network 112. Additionally, the client device 106 includes a digital image application 114, which optionally includes the digital image system 110 and the intelligent stroke rendering system 102, which further includes the multi-stroke neural network 112.

As shown in FIG. 1, in one or more implementations, the server device(s) 104 includes or hosts the digital image system 110. Specifically, the digital image system 110 includes, or is part of, one or more systems that implement digital image processing. For example, the digital image system 110 provides tools for viewing, generating, editing, and/or otherwise interacting with digital images (e.g., digital photographs, digital scans, computer generated images). To illustrate, the digital image system 110 communicates with the client device 106 via the network 108 to provide the tools for display and interaction via the digital image application 114 at the client device 106. Additionally, in some embodiments, the digital image system 110 receives data from the client device 106 in connection with editing digital images, including requests to access digital images stored at the server device(s) 104 (or at another device such as a source repository) and/or requests to store digital images from the client device 106 at the server device(s) 104 (or at another device). In some embodiments, the digital image system 110 receives interaction data for viewing, generating, or editing a digital image from the client device 106, processes the interaction data (e.g., to view, generate, or edit a digital image), and then provides the results of the interaction data to the client device 106 for display via the digital image application 114 or to a third-party system.

In one or more embodiments, the digital image system 110 provides tools for modifying digital images. In particular, the digital image system 110 provides tools (e.g., via the digital image application 114) for selecting, deleting, or adding content within a digital image. Additionally, the digital image system 110 utilizes the intelligent stroke rendering system 102 to intelligently modify content of a digital image (e.g., without requiring user input). For example, the digital image system 110 utilizes the intelligent stroke rendering system 102 to generate a modified version of the digital image according to a particular rendering style. To illustrate, the intelligent stroke rendering system 102 utilizes the multi-stroke neural network 112 to render a plurality of strokes onto a digital canvas according to a selected rendering style. Furthermore, in one or more embodiments, the intelligent stroke rendering system 102 utilizes a plurality of multi-stroke neural networks (e.g., a plurality of trained instances of the multi-stroke neural network 112 corresponding to different rendering styles).

In one or more embodiments, a neural network includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a deep learning model, a convolutional neural network, a recurrent neural network, a fully-connected neural network, or a combination of a plurality of neural networks and/or neural network types. In one or more embodiments, the multi-stroke neural network 112 includes, but is not limited to, a plurality of neural network layers to encode visual features of a digital image based on the visual characteristics of the digital image.

In one or more embodiments, after modifying a digital image utilizing the intelligent stroke rendering system 102, the digital image system 110 provides the modified digital image to the client device 106 for display. For instance, the digital image system 110 sends the modified digital image to the client device 106 via the network 108 for display via the digital image application 114. Additionally, the client device 106 can receive additional inputs to apply additional changes to the modified digital image or to replace the modified digital image with a different modified digital image (e.g., a different rendering style applied to the original digital image). The digital image system 110 then utilizes the intelligent stroke rendering system 102 to further modify the digital image or replace the modified digital image with a new modified digital image.

In one or more embodiments, the server device(s) 104 include a variety of computing devices, including those described below with reference to FIG. 9. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 9. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). In some embodiments, the client device 106 also performs functions for generating, capturing, or accessing data to provide to the digital image system 110 and the intelligent stroke rendering system 102 in connection with modifying digital images. For example, the client device 106 communicates with the server device(s) 104 via the network 108 to provide information (e.g., user interactions) associated with illuminating digital vector images. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the intelligent stroke rendering system 102 being implemented by a particular component and/or device within the system environment 100, the intelligent stroke rendering system 102 can be implemented, in whole or in part, by other computing devices and/or components in the system environment 100 (e.g., the client device 106).

In particular, in some implementations, the intelligent stroke rendering system 102 on the server device(s) 104 supports the intelligent stroke rendering system 102 on the client device 106. For instance, the intelligent stroke rendering system 102 on the server device(s) 104 generates or trains the intelligent stroke rendering system 102 (e.g., the multi-stroke neural network 112) for the client device 106. The server device(s) 104 provides the trained intelligent stroke rendering system 102 to the client device 106. In other words, the client device 106 obtains (e.g., downloads) the intelligent stroke rendering system 102 from the server device(s) 104. At this point, the client device 106 is able to utilize the intelligent stroke rendering system 102 to stylize digital images independently from the server device(s) 104.

In alternative embodiments, the intelligent stroke rendering system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital image stylization operations, and, in response, the intelligent stroke rendering system 102 or the digital image system 110 on the server device(s) 104 performs operations to generate and/or edit digital images. The server device(s) 104 then provide the output or results of the operations to the client device 106.

Figure 2:
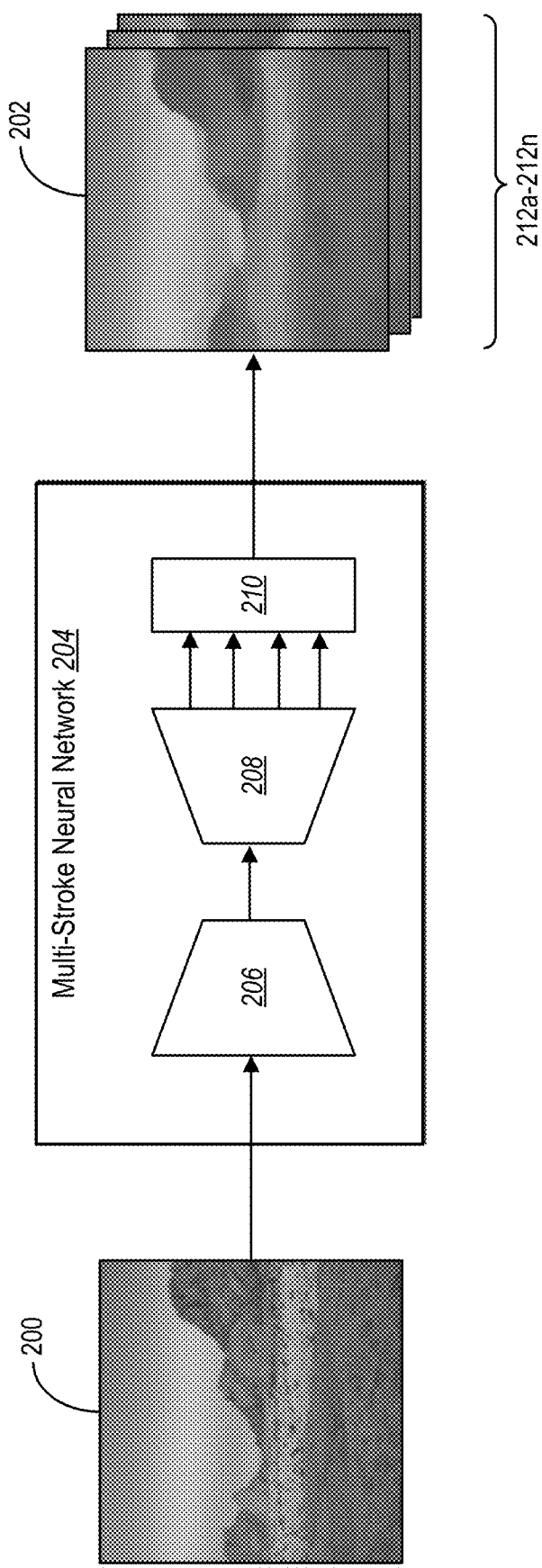
FIG. 2 illustrates a diagram of the intelligent stroke rendering system utilizing a multi-stroke neural network to generate strokes for reproducing a digital image in accordance with one or more implementations.

As mentioned, the intelligent stroke rendering system 102 stylizes digital images by intelligently rendering a plurality of strokes according to a particular rendering style. FIG. 2 illustrates the intelligent stroke rendering system 102 processing a digital image 200 to generate a modified digital image 202. Specifically, the intelligent stroke rendering system 102 utilizes a multi-stroke neural network 204 for sequentially rendering a plurality of digital drawing strokes onto a digital canvas.

In one or more embodiments, as illustrated in FIG. 2, the multi-stroke neural network 204 includes an encoder neural network 206 to encode features of the digital image 200. Additionally, in one or more embodiments, the multi-stroke neural network 204 includes a decoder neural network 208 to determine a sequence of stroke parameters (e.g., a concatenated set of stroke parameters) corresponding to a plurality of digital drawing strokes. Furthermore, FIG. 2 illustrates that the multi-stroke neural network 204 includes a renderer neural network 210 to render the plurality of digital drawing strokes to generate the modified digital image 202 (e.g., by generating the modified digital image 202 via rendering the plurality of digital drawing strokes on a plurality of digital canvas instances 212a-212n).

As described in more detail below with respect to FIGS. 3A-3B below, the intelligent stroke rendering system 102 utilizes the multi-stroke neural network 204 with one or more architectures to reconstruct a digital image by redrawing the digital image with a plurality of digital drawing strokes according to a particular rendering style. Furthermore, as described in more detail below with respect to FIGS. 4A-4B, the intelligent stroke rendering system utilizes one or more loss functions to train the multi-stroke neural network 204 for rendering digital images according to various rendering styles. The intelligent stroke rendering system 102 thus provides accurate and flexible stylization of digital images in one or more rendering styles via a single pass of the multi-stroke neural network 204.

As mentioned, the intelligent stroke rendering system 102 utilizes a multi-stroke neural network to generate a sequence of stroke parameters for rendering a plurality of digital drawing strokes to reproduce a digital image on a digital canvas. According to one or more embodiments, a digital drawing stroke includes a rendered path extending from an initial point to a terminal point. For example, a digital drawing stroke includes a rendered curve (e.g., a Bezier curve or B-spline) and/or one or more rendered straight lines. Furthermore, a digital drawing stroke includes attributes that determine a visual representation of the digital drawing stroke as rendered on a digital canvas. To illustrate, a digital drawing stroke includes a attributes such as, but not limited to, width/thickness, color, pattern, shape, or fill.

Furthermore, in one or more embodiments, a digital canvas includes a digital surface in which the intelligent stroke rendering system 102 renders one or more digital drawing strokes. For instance, a digital canvas includes a blank digital image including a specified background color or transparency. Additionally, in one or more embodiments, an instance of a digital canvas includes a digital canvas after one or more digital drawing strokes are rendered within the digital canvas (e.g., at one or more specific locations). To illustrate, the intelligent stroke rendering system 102 renders a sequence of digital drawing strokes onto a digital canvas, resulting in a plurality of instances of the digital canvas.

As mentioned, the intelligent stroke rendering system 102 utilizes a multi-stroke neural network that includes an architecture for generating a sequence of stroke parameters for stylizing a digital image. In particular, FIG. 3A illustrates a first architecture for a decoder neural network in a multi-stroke neural network. FIG. 3B illustrates a second architecture for a decoder neural network in a multi-stroke neural network.

Figure 3A:
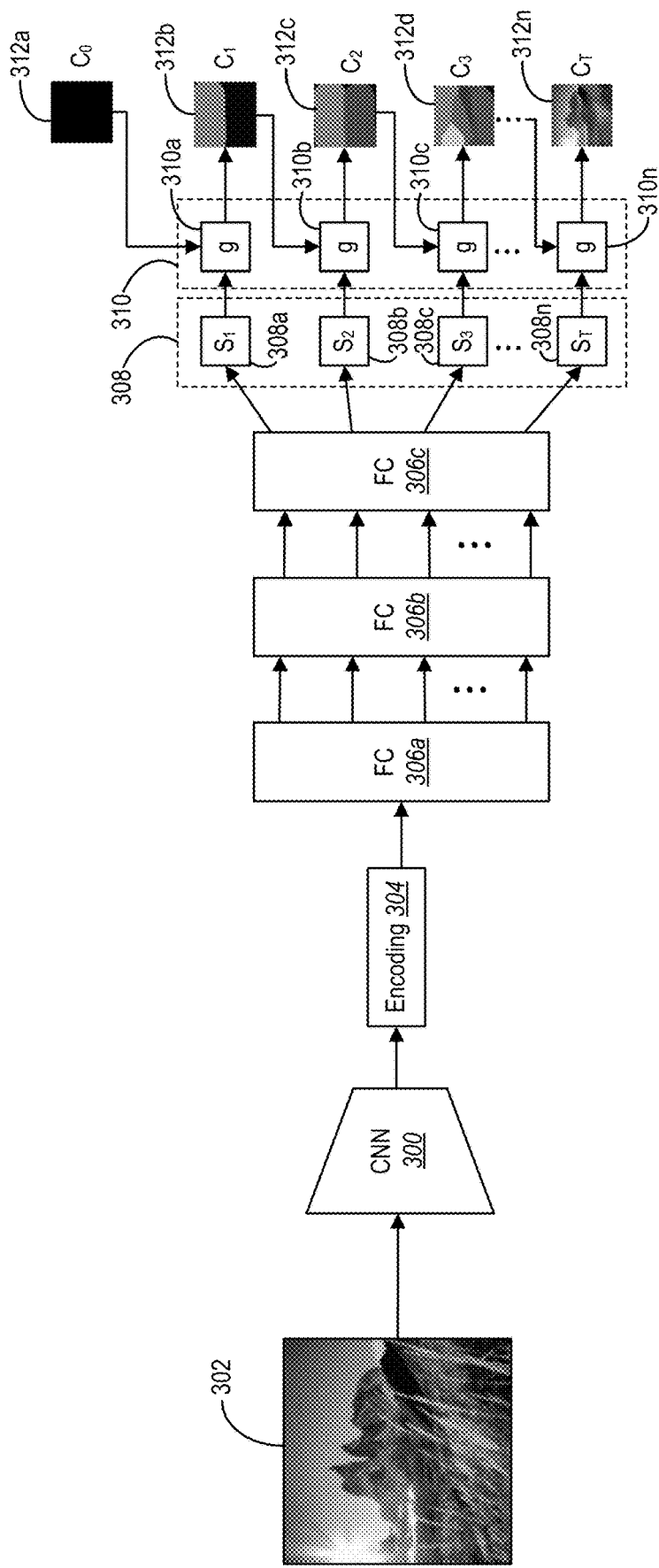
FIGS. 3A-3B illustrate diagrams of the intelligent stroke rendering system utilizing various configurations of a multi-stroke neural network in accordance with one or more implementations.

In one or more embodiments, as illustrated in FIG. 3A, the intelligent stroke rendering system 102 utilizes a multi-stroke neural network including an encoder neural network 300. For example, the encoder neural network 300 includes a convolutional neural network with one or more convolutional neural network layers. Furthermore, in one or more embodiments, the encoder neural network 300 includes a pre-trained convolutional neural network with a plurality of convolutional neural network layers for extracting features from digital images (e.g., a digital image 302 provided to the encoder neural network 300 by the intelligent stroke rendering system 102). Additionally, in connection with extracting features from the digital image 302, the encoder neural network 300 downsamples the digital image to a specific resolution (e.g., by downsampling at each of a plurality of convolutional neural network layers).

According to one or more embodiments, as illustrated in FIG. 3A, the encoder neural network 300 generates an encoding 304 based on the extracted features from the digital image 302. In particular, the encoder neural network 300 generates the encoding 304 to include feature maps of visual content in the digital image 302 based on feature representations learned by the encoder neural network 300. To illustrate, the encoding 304 includes a multi-dimensional feature vector (or a plurality of multi-dimensional feature vectors) based on the extracted feature maps. For instance, each feature vector includes 512 dimensions, though in other embodiments, each feature vector includes a different number of dimensions (e.g., 256, 1024) based on the architecture of the encoder neural network 300.

In one or more embodiments, the intelligent stroke rendering system 102 passes the encoding 304 to a decoder neural network. For instance, as illustrated in FIG. 3A, the decoder neural network includes a stack of fully connected neural network layers. To illustrate, the decoder neural network includes a first fully connected neural network layer 306a that receives the encoding 304 as input. Additionally, the decoder neural network includes a second fully connected neural network layer 306b and a third fully connected neural network layer 306c in series following the first fully connected neural network layer 306a.

In one or more embodiments, the fully connected neural network layers include non-linear fully connected neural network layers. Furthermore, while FIG. 3A illustrates that the decoder neural network includes a stack of three fully connected neural network layers, in other embodiments, the intelligent stroke rendering system 102 utilizes a decoder neural network including a different number of fully connected neural network layers. To illustrate, the decoder neural network can include fewer than three fully connected neural network layers or more than three fully connected neural network layers.

Additionally, as illustrated in FIG. 3A, the intelligent stroke rendering system 102 utilizes the stack of fully connected neural network layers to generate a stroke parameter sequence 308 from the encoding 304. Specifically, the stack of fully connected neural network layers utilizes the feature maps of the encoding 304 to generate a plurality of stroke parameters corresponding to a plurality of digital drawing strokes to stylize the digital image 302. For example, the first fully connected neural network layer 306a determines an initial set of feature representations corresponding to stroke parameters from the encoding 304. The second fully connected neural network layer 306b then refines the feature representations generated by the first fully connected neural network layer 306a. Furthermore, the third fully connected neural network layer 306c refines the feature representations generated by the second fully connected neural network layer 306b.

To illustrate, the stack of fully connected neural network layers of the decoder neural network includes a plurality of fully connected convolutional neural network layers. In one or more additional embodiments, the decoder neural network includes one or more rectified linear unit layers with one or more of the fully connected neural network layers. For instance, the decoder neural network includes a rectified linear unit layer after each of the first fully connected neural network layer 306a and the second fully connected neural network layer 306b. Additionally, in one or more embodiments, the decoder neural network includes an activation function (e.g., a sigmoid function) after one or more layers of the stack of fully connected neural network layers to generate the stroke parameter sequence 308.

According to one or more embodiments, the stack of fully connected neural network layers generates a set of stroke parameters for each digital drawing stroke for stylizing the digital image according to a specific rendering style. For instance, the intelligent stroke rendering system 102 utilizes the stack of fully connected neural network layers to generate a vector of stroke parameters for each digital drawing stroke. To illustrate, the vector includes, but is not limited to, a plurality of points (e.g., coordinate locations for a start point, a midpoint, and an end point), radii and transparencies of one or more of the points, and an RGB color for rendering a digital drawing stroke on a digital canvas. Accordingly, in one or more embodiments, the intelligent stroke rendering system 102 generates a multi-dimensional vector (e.g., a 13-dimensional vector) for each of the digital drawing points, resulting in a plurality of multi-dimensional vectors for the plurality of digital drawing strokes.

Furthermore, in one or more embodiments, the intelligent stroke rendering system 102 utilizes the fully connected neural network layers to generate the stroke parameter sequence 308 according to an order in which the intelligent stroke rendering system 102 will render a plurality of digital drawing strokes on a digital canvas. In particular, the decoder neural network generates the stroke parameter sequence 308 to include first stroke parameters 308a (e.g., a first feature representation of stroke parameters) corresponding to a first digital drawing stroke. Additionally, the decoder neural network generates the stroke parameter sequence 308 to include second stroke parameters 308b (e.g., a second feature representation of stroke parameters) corresponding to a second digital drawing stroke to be rendered subsequent (e.g., directly following) the first digital drawing stroke. Similarly, the decoder neural network generates the stroke parameter sequence 308 to include third stroke parameters 308c and additional stroke parameters in sequence through final stroke parameters 308n.

After generating the stroke parameter sequence 308 via the stack of fully connected neural network layers, in one or more embodiments, the intelligent stroke rendering system 102 utilizes a renderer neural network 310 to generate digital drawing strokes from the stroke parameter sequence. In one or more embodiments, as illustrated in FIG. 3A, the renderer neural network 310 includes a differentiable renderer neural network that converts the feature representations in the stroke parameter sequence 308 into digital drawing strokes rendered onto a digital canvas. In one or more embodiments, the renderer neural network 310 includes a pre-trained neural network that approximates a non-differentiable renderer. For instance, as illustrated in FIG. 3A, the renderer neural network 310 renders the first digital drawing stroke onto an initial digital canvas instance 312a (e.g., a digital canvas without any digital drawing strokes) based on the first stroke parameters 308a to create a first digital canvas instance 312b.

In one or more additional embodiments, the renderer neural network 310 continues rendering digital drawing strokes within the digital canvas based on the stroke parameter sequence 308. To illustrate, the renderer neural network 310 renders a second digital drawing stroke based on the second stroke parameters 318b to generate a second digital canvas instance 312c, a third digital drawing stroke based on the third stroke parameters 318c to generate a third digital canvas instances 312d, etc., until generating a final digital canvas instance 312n by rendering a final digital drawing stroke based on the final stroke parameters 318n. As shown, the final digital canvas instance 312n can represent a reproduced digital image based on the digital image 302.

By rendering each of the digital drawing strokes in sequence according to the stroke parameter sequence 308, the intelligent stroke rendering system 102 reproduces the digital image via the selected rendering style according to learned visual features. For example, the intelligent stroke rendering system 102 utilizes the renderer neural network 310 to render digital drawing strokes in a way that produces broader details or common colors (e.g., sky/ground colors) initially and finer details (e.g., high frequency information such as grass blades) toward the end of the sequence of digital drawing strokes. Furthermore, as the renderer neural network 310 renders each digital drawing stroke, the renderer neural network 310 covers portions of large digital drawing strokes corresponding to broader details with smaller digital drawing strokes based on the positions and other attributes of later digital drawing strokes in the sequence.

Figure 4A:
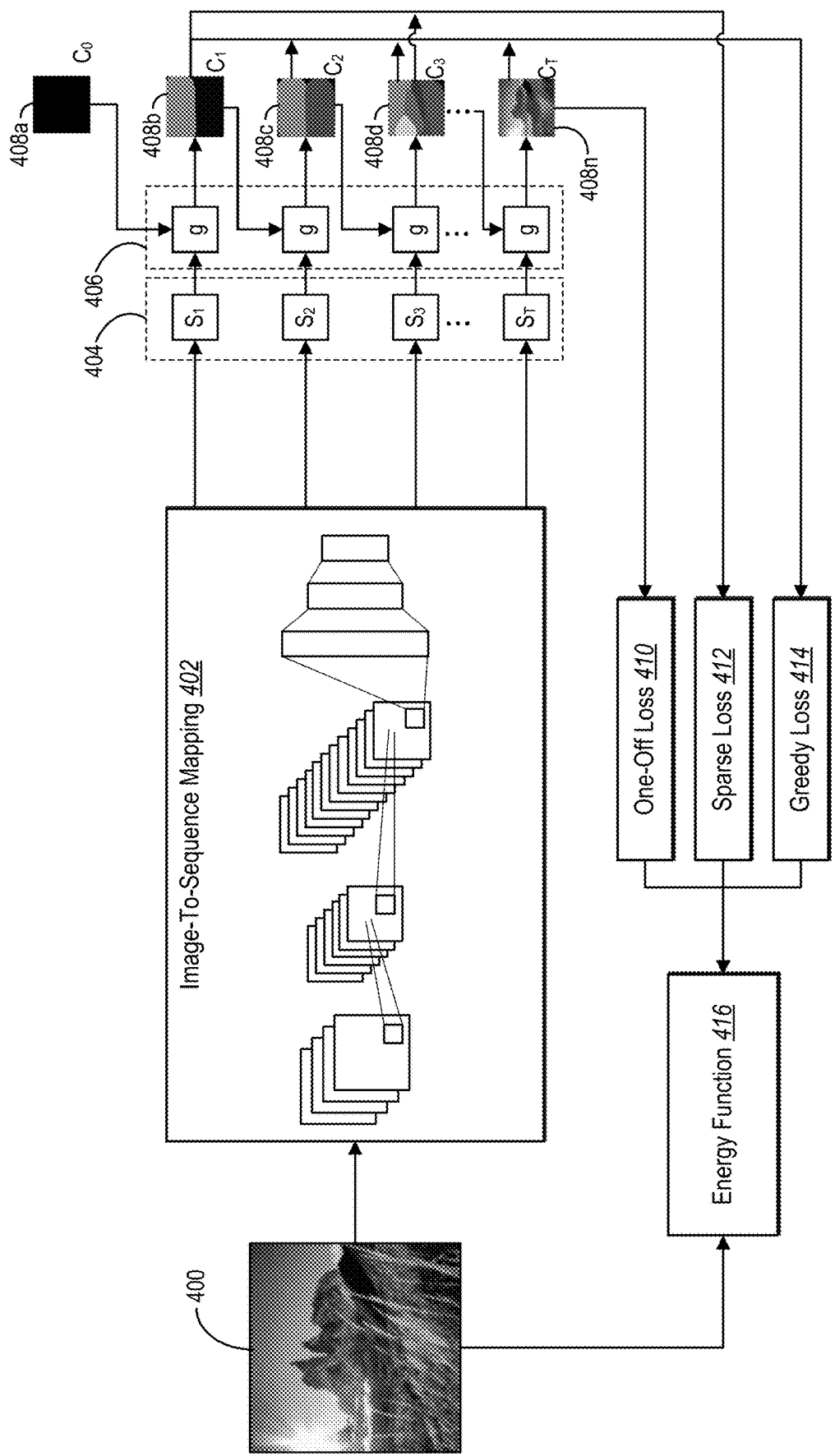
FIGS. 4A-4B illustrate diagrams of the intelligent stroke rendering system determining a plurality of losses for modifying parameters of a multi-stroke neural network in accordance with one or more implementations.
Figure 4B:
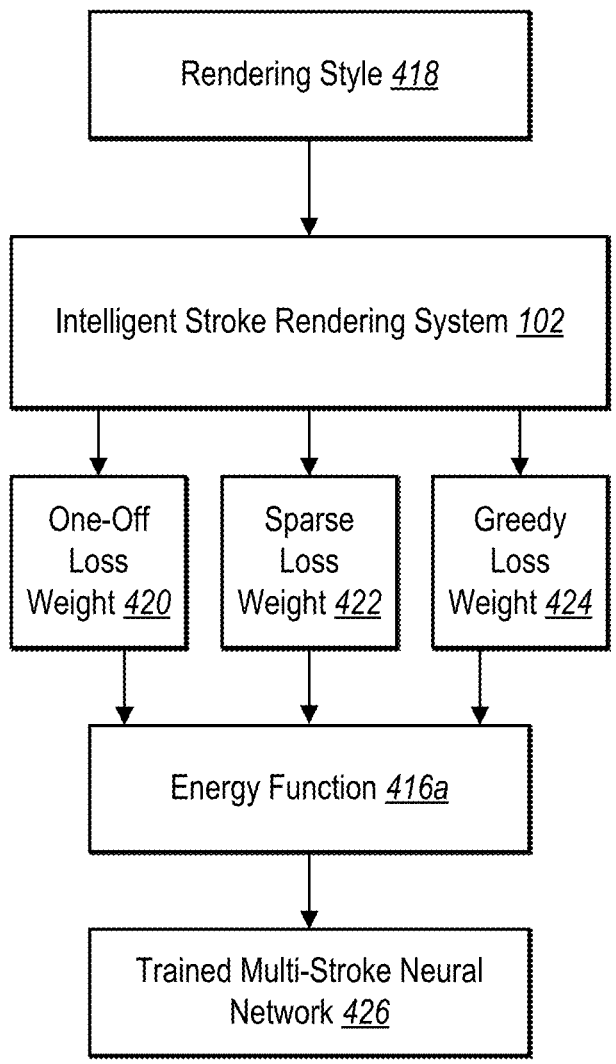

As mentioned, FIG. 4B illustrates an alternative architecture of a decoder neural network in a multi-stroke neural network. Specifically, as illustrated, the multi-stroke neural network includes an encoder neural network 312 to generate an encoding 314 from the digital image 302. For example, as mentioned, the encoder neural network 312 encodes a plurality of feature maps into the encoding 314 based on the visual content of the digital image 302.

After generating the encoding, the intelligent stroke rendering system 102 utilizes a multi-stroke neural network including a decoder neural network with one or more fully connected neural network layers and one or more long short-term memory neural networks. To illustrate, as in FIG. 3B, the decoder neural network includes a first fully connected neural network layer 316a, which is followed by a long short-term memory neural network 318, which is followed by a second fully connected neural network layer 316b. Accordingly, the first fully connected neural network layer 316a receives the encoding 314 as an input and then generates a plurality of feature representations corresponding to an initial sequence of stroke parameters. The long short-term memory neural network 318 receives the plurality of feature representations to provide to the second fully connected neural network layer 316b, which then generates a stroke parameter sequence 320.

In one or more embodiments, the long short-term memory neural network 318 includes a plurality of cells 322a-322n corresponding to a number of feature representations generated by the fully connected neural network layer 316. Specifically, the cells 322a-322n each receive a feature representation and a previous hidden state vector and then output a current hidden state vector. The long short-term memory neural network 318 thus generates a plurality of hidden state vectors from the feature representations to use in determining the stroke parameter sequence 320 via the second fully connected neural network layer 316b.

To illustrate, the long short-term memory neural network 318 includes a first cell 322a that receives a first feature representation from the fully connected neural network layer 316 as input. Additionally, the first cell 322a receives a first hidden state vector 324a (e.g., an initialization hidden state vector). The first cell 322a generates a current hidden state vector based on the first feature representation and the first hidden state vector 324a. In one or more embodiments, the hidden state vector output by the first cell 322a includes (or provides a basis for) first stroke parameters in the stroke parameter sequence 320. The long short-term memory neural network 318 feeds the hidden state vector of each cell into the subsequent cell for generating a plurality of hidden state vectors until generating a final hidden state vector 324n via a final cell 322n.

In one or more additional embodiments, the decoder neural network that includes a long short-term memory neural network also includes one or more additional fully connected neural network layers or fewer fully connected neural network layers. To illustrate, although FIG. 3B illustrates a first fully connected neural network layer and a second fully connected neural network layer, the decoder neural network can include a single fully connected neural network layer before the long short-term memory neural network layer, such that the decoder neural network includes only one fully connected neural network layers before the long short-term memory neural network layer. In alternative embodiments, the decoder neural network layer includes more than one long short-term memory neural network layer, such as in a series of long short-term memory neural network layers.

Figure 3B:
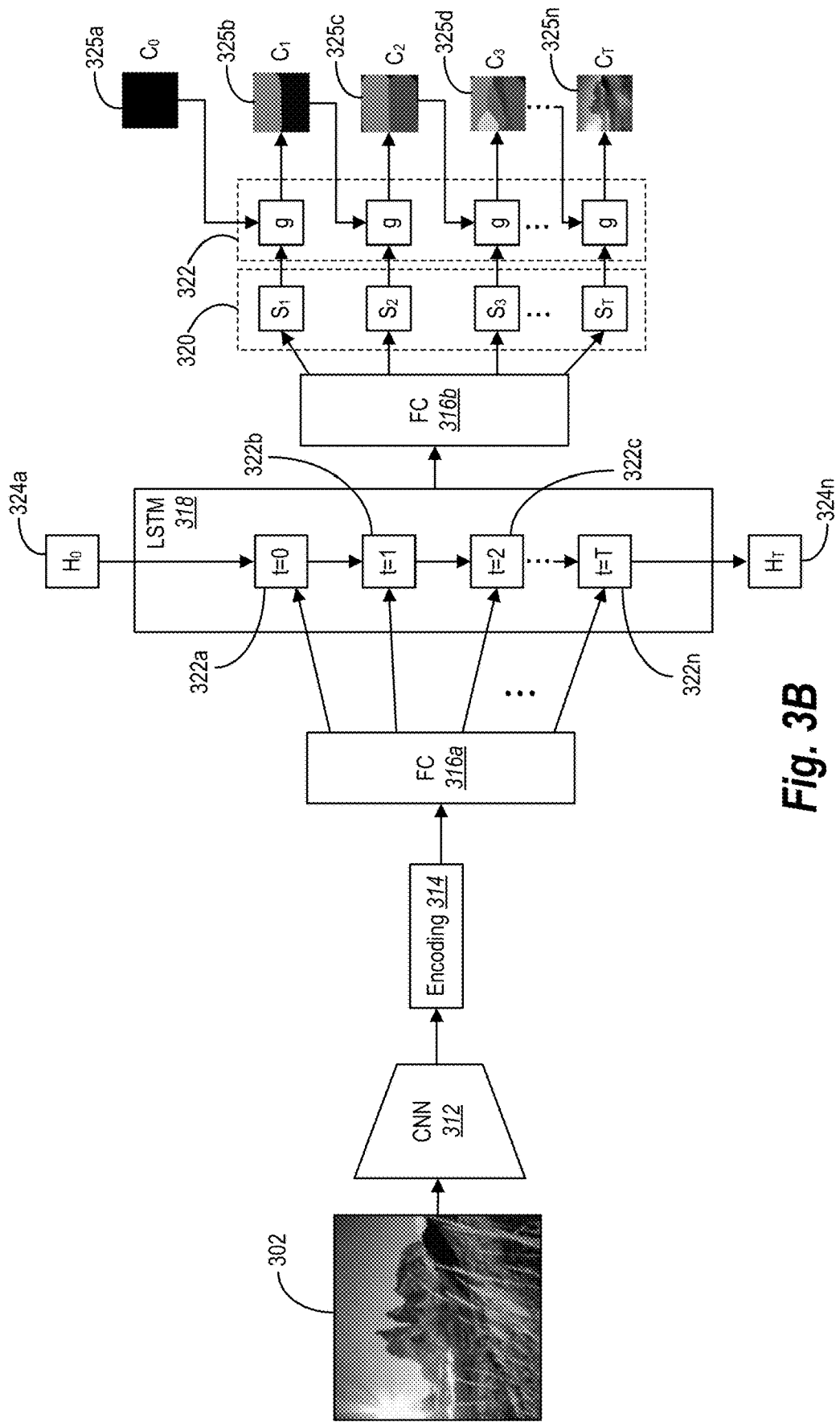

According to one or more embodiments, as illustrated in FIG. 3B, the multi-stroke neural network includes a renderer neural network 323 that reproduces the digital image 302 based on the stroke parameter sequence 320. Specifically, the renderer neural network 323 processes the stroke parameter sequence 320 to render a plurality of digital drawing strokes within a digital canvas. Thus, as illustrated, the renderer neural network 323 renders the plurality of digital drawing strokes in sequence, resulting in a plurality of digital canvas instances 325a-325n.

Although FIGS. 3A-3B illustrate multi-stroke neural networks with specific architectures of encoder neural networks and decoder neural networks, in alternative embodiments, the intelligent stroke rendering system 102 utilizes other architectures of encoder neural networks or decoder neural networks. For instance, the intelligent stroke rendering system 102 utilizes one or more encoder neural networks including deep neural networks, transformer neural networks, recurrent neural networks, multilayer perceptron neural networks, or others. In additional examples, the intelligent stroke rendering system 102 utilizes one or more decoder neural networks including recurrent neural networks, gated recurrent units, or other neural networks capable of generating a sequence of stroke parameters based on an encoding of features in a digital image.

In some embodiments, the intelligent stroke rendering system 102 also utilizes a plurality of multi-stroke neural networks to render a plurality of sets of digital drawing strokes. For example, the intelligent stroke rendering system 102 uses a first multi-stroke neural network to render a first set of digital drawing strokes and a second multi-stroke neural network to render a second set of digital drawing strokes after the first set of digital drawing strokes. The intelligent stroke rendering system 102 can thus provide a first level of detail with the first strokes and a second level of detail with the second strokes. The intelligent stroke rendering system 102 can also apply a plurality of different rendering styles to a single reconstruction/stylization of a digital image via a plurality of multi-stroke neural networks.

In connection with utilizing a multi-stroke neural network to generate stroke parameter sequences, the intelligent stroke rendering system 102 also utilizes various losses to determine rendering styles for reproducing digital images. As mentioned, FIGS. 4A-4B illustrate that the intelligent stroke rendering system 102 utilizes a combination of losses to determine a particular rendering style for reproducing a digital image. In particular, the intelligent stroke rendering system 102 learns parameters of a multi-stroke neural network based on the combination of losses to reproduce digital images according to a particular rendering style.

FIG. 4A illustrates that the intelligent stroke rendering system 102 processes a digital image 400 utilizing a multi-stroke neural network to reproduce the digital image 400 according to a particular rendering style. In one or more embodiments, as illustrated, the intelligent stroke rendering system 102 utilizes the multi-stroke neural network to generate an image-to-sequence mapping 402. More specifically, as previously described, the intelligent stroke rendering system 102 utilizes the multi-stroke neural network to generate an encoding of feature maps from the digital image 400. Additionally, the intelligent stroke rendering system 102 utilizes the multi-stroke neural network to generate a stroke parameter sequence 404 based on the encoding.

FIG. 4A also illustrates that the intelligent stroke rendering system 102 utilizes a renderer neural network 406 (e.g., as part of the multi-stroke neural network or after the multi-stroke neural network) to render a plurality of digital drawing strokes based on the stroke parameter sequence 404. Specifically, as illustrated, the intelligent stroke rendering system 102 generates a plurality of digital canvas instances 408*a*-408*n* by rendering individual digital drawing strokes according to the stroke parameter sequence 404. Accordingly, the intelligent stroke rendering system 102 generates a stylized digital image based on a final digital canvas instance 408*n* including the plurality of digital drawing strokes.

As illustrated in FIG. 4A, the intelligent stroke rendering system 102 determines a plurality of losses based on the digital image 400 and the digital canvas instances 408*a*-408*n*. In one or more embodiments, the intelligent stroke rendering system 102 determines a one-off loss 410 by comparing the digital image 400 to the final digital canvas instance 408*n*. For instance, the intelligent stroke rendering system 102 determines the one-off loss 410 based on a difference between the digital image 400 and the final digital canvas instance 408*n*. To illustrate, the intelligent stroke rendering system 102 determines the one-off loss 410 based on a perceptual distance and/or pixel loss between the digital image 400 and the final digital canvas instance 408*n*.

In one or more embodiments, the intelligent stroke rendering system 102 determines a sparse loss 412 by comparing the digital image 400 to a subset of digital canvas instances. For example, the intelligent stroke rendering system 102 determines the sparse loss 412 based on a plurality of differences between the digital image 400 and digital canvas instances at a set of intermediate digital canvas instances (e.g., every other instance, every third instance, every fiftieth instance). As illustrated in FIG. 4A, for instance, the intelligent stroke rendering system 102 determines the sparse loss 412 based on a first difference between the digital image 400 and a first digital canvas instance 408*b* (after rendering a first digital drawing stroke), a second difference between the digital image 400 and a third digital canvas instance 408*d* (after rendering the first digital drawing stroke, a second digital drawing stroke, and a third digital drawing stroke), etc. The intelligent stroke rendering system 102 thus determines the sparse loss 412 based on the perceptual distance and/or pixel loss between the digital image 400 and a plurality of digital canvas instances (but not all instances).

In one or more additional embodiments, the intelligent stroke rendering system 102 determines a greedy loss 414 by comparing the digital image 400 to a plurality of digital canvas instances corresponding to a plurality of digital drawing strokes. For instance, the intelligent stroke rendering system 102 determines the greedy loss 414 based on differences between the digital image 400 and each digital canvas instance rendered on an initial canvas instance 408*a*. To illustrate, the intelligent stroke rendering system 102 determines the greedy loss 414 based on perceptual distances and/or pixel losses between the digital image 400 and each of the plurality of digital canvas instances after rendering each of the digital drawing strokes (e.g., digital canvas instances 408*b*-408*n*).

As illustrated in FIG. 4A, the intelligent stroke rendering system 102 determines an energy function 416 incorporating the plurality of losses. Specifically, the intelligent stroke rendering system 102 determines the energy function 416 by combining the plurality of losses in different ways to achieve different rendering styles. For example, the intelligent stroke rendering system 102 determines weights associated with the plurality of losses to achieve a particular rendering style. Accordingly, the intelligent stroke rendering system 120 determines different weights for the plurality of losses in connection with different rendering styles. In one or more embodiments, the intelligent stroke rendering system 102 trains the multi-stroke neural network by backpropagating the losses within the multi-stroke neural network according to the energy function 416.

In one or more embodiments, the one-off loss 410, the sparse loss 412, and the greedy loss 414 provide different rendering behaviors. For instance, the one-off loss 410 encourages a loose/abstracted drawing/painting style, the greedy loss 414 encourages a greedy/precise drawing/painting style, and the sparse loss 412 encourages an abstracted drawing/painting style that is less abstracted than the one-off loss 410. By combining the losses in different ways (e.g., via different weights), the intelligent stroke rendering system 102 trains the multi-stroke neural network to achieve a variety of different rendering styles. In additional embodiments, the intelligent stroke rendering system 102 further encourages certain rendering styles via the use of different decoder architectures (e.g., as illustrated in FIGS. 3A-3B).

FIG. 4B illustrates a diagram in which the intelligent stroke rendering system 102 determines a combination of losses for achieving a specific rendering style. To illustrate, the intelligent stroke rendering system 102 determines a rendering style 418 that corresponds to a particular level of abstraction and/or precision. In one or more embodiments, the intelligent stroke rendering system 102 determines the rendering style based on a selected rendering style (e.g., via a user input). Additionally, in some examples, the rendering style 418 includes information about a desired accuracy and/or artistic style.

In connection with determining the rendering style 418, the intelligent stroke rendering system 102 determines a plurality of weights corresponding to the plurality of losses in FIG. 4A. For instance, the intelligent stroke rendering system 102 determines a one-off loss weight 420 corresponding to the one-off loss 410. Additionally, the intelligent stroke rendering system 102 determines a sparse loss weight 422 corresponding to the sparse loss 412. Furthermore, the intelligent stroke rendering system 102 determines a greedy loss weight 424 corresponding to the greedy loss 414. The intelligent stroke rendering system 102 thus combines the losses and their corresponding weights to determine an energy function 416*a* for training a multi-stroke neural network. In some embodiments, a weight for a given loss ranges from 0 to 1.

After determining the energy function 416*a*, the intelligent stroke rendering system 102 trains a multi-stroke neural network. Specifically, the intelligent stroke rendering system 102 utilizes backpropagation to modify parameters of the multi-stroke neural network according to the energy function 416*a* (and the corresponding weights). As illustrated in FIG. 4B, the intelligent stroke rendering system 102 trains the multi-stroke neural network according to the energy function 416*a*, resulting in a trained multi-stroke neural network 426 corresponding to the rendering style 418. In various embodiments, the intelligent stroke rendering system 102 generates a plurality of different multi-stroke neural networks for different rendering styles by utilizing different combinations of loss weights.

Figure 5A:
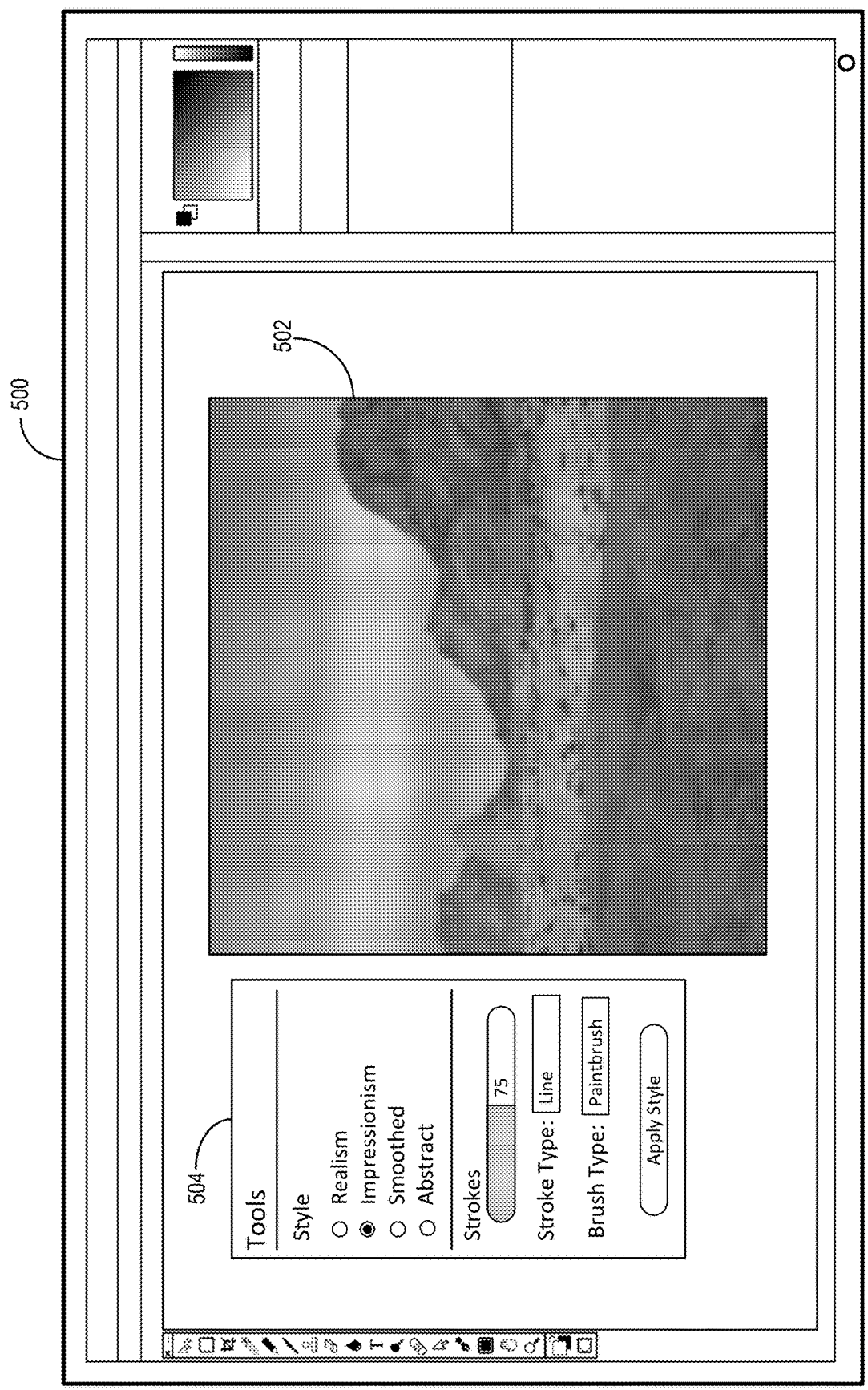
FIGS. 5A-5B illustrate graphical user interfaces for modifying a digital image utilizing the intelligent stroke rendering system in accordance with one or more implementations.
Figure 5B:
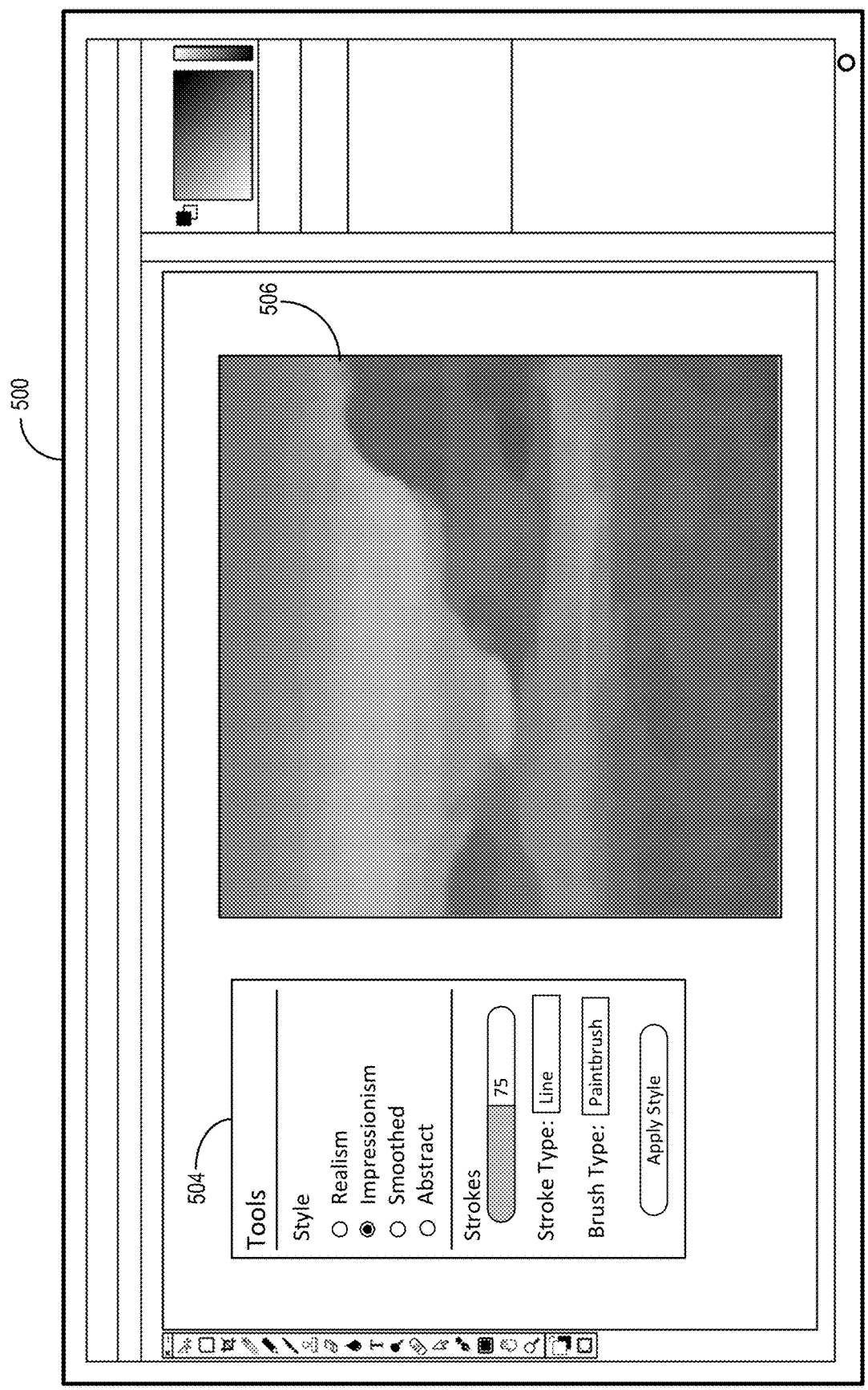

FIGS. 5A-5B illustrate graphical user interfaces of a client device 500 within a digital image application. Specifically, as illustrated in FIG. 5A, the client device 500 displays a digital image 502 including a digital photograph of a landscape. In one or more embodiments, the intelligent stroke rendering system 102 modifies the digital image in response to user inputs via the client device 500. For example, the client device 500 receives one or more user inputs within the digital image application to modify the digital image 502 by stylizing the digital image 502 according to a particular rendering style.

To illustrate, the client device 500 displays tools 504 for stylizing the digital image 502. According to one or more embodiments, the tools 504 include one or more options to select a specific rendering style. For instance, the tools 504 include options to select from a realism rendering style, an impressionism rendering style, a smoothed rendering style, an abstract rendering style, or other types of rendering styles. In additional examples, the client device 500 displays options to select from more abstract or more precise along a scale (e.g., a slider input) that indicates the level of abstraction.

In one or more embodiments, the client device 500 also provides one or more options for customizing digital drawing strokes. In particular, the tools 504 include options to specify the number of digital drawing strokes for stylizing the digital image 502. For example, if a user input specifies a number of digital drawing strokes as 75, the intelligent stroke rendering system 102 stylizes the digital image 502 utilizing a sequence of 75 digital drawing strokes. In alternative embodiments, the intelligent stroke rendering system 102 determines the number of digital drawing strokes based on a perceptual distance between the digital image 502 and a resulting image and/or based on a rendering budget (e.g., time/processing budget).

In one or more embodiments, the intelligent stroke rendering system 102 trains different neural networks for the different rendering styles/stroke types/brush types, etc. Specifically, the intelligent stroke rendering system 102 trains a plurality of multi-stroke neural networks corresponding to the different rendering styles. The intelligent stroke rendering system 102 then selects a multi-stroke neural network corresponding to a selected rendering style and then stylizes the digital image 502 utilizing the selected multi-stroke neural network. In some embodiments, the intelligent stroke rendering system 102 applies specific stroke properties to a sequence of stroke parameters after generating the sequence of stroke parameters utilizing the selected multi-stroke neural network.

Additionally, the intelligent stroke rendering system 102 determines one or more additional properties associated with stylizing the digital image 502. For instance, as illustrated in FIG. 5A, the tools 504 include options for setting a stroke type and a brush type. To illustrate, in response to an indication of a stroke type, the intelligent stroke rendering system 102 stylizes the digital image 502 applies a shape (e.g., line, square, circle) when stylizing the digital image 502. Furthermore, in response to an indication of a brush type, the intelligent stroke rendering system 102 applies a brush (e.g., paintbrush, pencil, airbrush) when stylizing the digital image 502. Thus, the client device 500 provides a plurality of customization options for customizing the rendering style when stylizing the digital image 502. FIG. 5B illustrates that the client device 500 displays a stylized digital image 506 after applying a rendering style and/or rendering customization options for stylizing the digital image 502.

In one or more additional embodiments, the client device 500 receives additional inputs to apply or modify a rendering style to the digital image 502. For example, the client device 500 receives an additional input to change the rendering style and/or stroke properties. The intelligent stroke rendering system 102 updates the stylized digital image 506 in response to the additional inputs by re-drawing the stylized digital image 506 with a new sequence of digital drawing strokes. Furthermore, in some embodiments, the client device 500 receives additional inputs to share the stylized digital image 506 with another device (e.g., via a social media system such as by assigning the stylized digital image 506 as a profile picture).

According to one or more embodiments, the intelligent stroke rendering system 102 utilizes a multi-stroke neural network including a direct non-linear mapping neural network represented as f: $\mathcal{J} \rightarrow \mathcal{S}^{T \times n}$ from a digital image to a digital drawing stroke sequence in which n represents a number of stroke parameters for each digital drawing stroke (e.g., n=13 stroke parameters). In particular, the multi-stroke neural network includes an encoder neural network that extracts feature maps via a convolutional architecture. Furthermore, the multi-stroke neural network includes a decoder neural network D that maps the feature maps in the encoding into a fixed sequence of stroke parameters $s_i = \{s_1, s_2, \ldots, s_T\}$ in which T represents the number of digital drawing strokes, and the sequence results in a T×n vector. The multi-stroke neural network also includes a renderer neural network g (e.g., a differentiable renderer) to render the stroke parameters onto a digital canvas.

As illustrated in FIGS. 3A-3B, the intelligent stroke rendering system 102 can utilize a multi-stroke neural network with one of a plurality of different architectures. For example, the intelligent stroke rendering system 102 utilizes a multi-stroke neural network with one of two different decoder neural network architectures, $D_{FC}$ and $D_{LSTM}$. The first architecture, $D_{FC}$, refers to the architecture of FIG. 3A including a stack of fully connected neural network layers, and the second architecture, $D_{LSTM}$, refers to the architecture in FIG. 3B including a long short-term memory neural network. In one or more embodiments, the intelligent stroke rendering system 102 utilizes a multi-stroke neural network including the $D_{FC}$ architecture for rendering styles with more precise digital image stylization by resizing and transforming features into a fixed sequence of strokes.

In additional embodiments, the intelligent stroke rendering system 102 utilizes a multi-stroke neural network including the $D_{LSTM}$ architecture for varied rendering styles. Furthermore, in one or more embodiments, the $D_{LSTM}$ uses average pooling on the features to obtain a vector $H \in \mathbb{R}^{512}$ before feeding the features into the first fully connected neural network layer. The first fully connected neural network layer expands H into $W \in \mathbb{R}^{512 \times T}$, forming the sequence of vectors input to the long short-term memory neural network. In one or more embodiments, a second fully connected neural network layer followed by a sigmoid activation function outputs the sequence of stroke parameters.

According to one or more embodiments, the $D_{FC}$ architecture includes a plurality of convolutional blocks (e.g., four convolutional neural network layers) for extracting a set of feature maps $X_i \in \chi^{512 \times 4 \times 4}$ from a digital image $I_i$. The intelligent stroke rendering system 102 feeds the feature maps $X_i$ into three fully connected neural network layers including rectified linear units and/or an activation function (e.g., a sigmoid function). According to additional embodiments, the $D_{LSTM}$ architecture includes a long short-term memory neural network in place of one or more of the fully connected neural network layers. The intelligent stroke rendering system 102 thus utilizes a multi-stroke neural network to generate a stroke parameter sequence to generate a stylized version of the digital image $I_i$.

As mentioned, the intelligent stroke rendering system 102 utilizes an encoder neural network and a decoder neural network to generate a stroke parameter sequence for rendering by a renderer neural network. In one or more embodiments, the intelligent stroke rendering system 102 generates a 13-dimensional tuple that encodes start, middle, and end points of a quadratic Bezier curve, radii and transparence of start and end points, and RGB colors of each digital drawing stroke. The intelligent stroke rendering system 102 utilizes a pre-trained renderer neural network g to approximate a non-differentiable renderer. The renderer neural network g receives the entire sequence of stroke parameters and sequentially updates an initial digital canvas $C_0$.

In one or more embodiments, the intelligent stroke rendering system 102 controls the rendering style utilizing a plurality of losses based on one or more digital canvas instances. For example, the intelligent stroke rendering system 102 passes the rendered canvas $C_t$ to an energy function $\Phi$ including a combination of a plurality of losses that determine the rendering style. The intelligent stroke rendering system 102 backpropagates the error from the energy function $\Phi$, thereby adjusting the parameters of the multi-stroke neural network.

According to one or more embodiments, the intelligent stroke rendering system 102 determines the energy function $\Phi$ as a combination of loss functions to yield a particular rendering style as:

$$\Phi := \sum_{r=1}^{|R|} \lambda_r \mathcal{L}_r$$

in which |R| represents the total number of loss functions and $\lambda_r$ represents a hyperparameter corresponding to a weight of the loss function $\mathcal{L}_r$. In one or more embodiments, the intelligent stroke rendering system 102 utilizes an $\mathcal{L}_1$ loss function to determine the perceptual distance between a digital image and a given digital canvas image. In other embodiments, the intelligent stroke rendering system 102 utilizes an $\mathcal{L}_2$ loss function to determine perceptual distance between a digital image and a given digital canvas image. Alternatively, the intelligent stroke rendering system 102 utilizes a combination of losses to determine perceptual distances.

In one or more embodiments, the intelligent stroke rendering system 102 determines a plurality of different losses in combination via an energy function to produce different stylistic variations. For example, the intelligent stroke rendering system 102 utilizes the following losses to adjust the level of visual abstraction:

$$\text{greedy} := \sum_{t=0}^{T} \gamma \Phi(I_i, C_t)$$

$$\text{sparse} := \sum_{t=0}^{T/k} \gamma \Phi(I_i, C_{kt})$$

$$\text{one-off} := \Phi(I_i, C_T)$$

In one or more embodiments, if $\gamma=1$ in the greedy loss algorithm above, the intelligent stroke rendering system 102 produces a greedy behavior due to backpropagated error at every time step guides intermediate canvas instances to be as close as possible to the reference image. In alternative instances, the intelligent stroke rendering system 102 causes digital drawing strokes rendered toward the end of a sequence to be more determinant in the resulting rendered style. For instance, the intelligent stroke rendering system 102 sets $\gamma$ as a function of a stroke budget $\gamma=0.99^{T-t}$.

According to one or more embodiments, the intelligent stroke rendering system 102 provides increased abstraction in a rendering style via the sparse loss. Specifically, by backpropagating the error of the energy function every kth time step, the intelligent stroke rendering system 102 encourages a less rigid rendering style. Furthermore, the one-off loss represents an edge case of the sparse loss to encourage a non-greedy, loose rendering style. Additionally, the intelligent stroke rendering system 102 utilizes a combination of the greedy loss, the sparse loss, and the one-off loss to determine a number of different style variations.

In some embodiments, the intelligent stroke rendering system 102 determines a rendering style including a particular level of visual abstraction according to specific constraints of the neural network. For instance, the intelligent stroke rendering system 102 determines the constraints including, but not limited to, varying optimization guidance, stroke budget, shape constraints, or drawing motion speed. According to some embodiments, the intelligent stroke rendering system 102 determines that a stroke budget threshold (e.g., 300 digital drawing strokes) is sufficient to achieve a plurality of different rendering styles with a threshold accuracy. In other embodiments, the intelligent stroke rendering system 102 determines a different number of digital drawing strokes for achieving a particular rendering style (e.g., a lower number of digital drawing strokes for more abstract rendering styles or a higher number of digital drawing strokes for more realistic rendering styles).

In one or more embodiments, the intelligent stroke rendering system 102 determines the energy function $\Phi$ in an optimization schema to produce a rendering style with a more realistic or precise rendering style as:

$$\Phi_{precise} = \lambda_1 \sum_{t=1}^{T} \mathcal{L}_{pixel_1} - \lambda_2 \mathcal{L}_{perc}$$

in which T represents a time budget, $\lambda_1$ represents the weight of a pixel loss, and $\lambda_2$ represents the weight of a perceptual loss. In addition, the intelligent stroke rendering system 102 utilizes the least absolute deviation (or $\mathcal{L}_1$) between a digital image $I_i$ and a digital canvas at each time t, $C_t$ as the pixel loss. Furthermore, in one or more embodiments, the intelligent stroke rendering system 102 captures the pixel loss by capturing the difference in overall composition and color (in image space) between the reference image and the progress of the reproduced digital image (at specific canvas instances). At each time step, the intelligent stroke rendering system 102 renders each digital drawing stroke on a digital canvas $C_t$, and the intelligent stroke rendering system 102 calculates the pixel loss over all time steps.

$$\mathcal{L}_{pixel} = \sum_{t=1}^{T} \|I_i - C_t\|_1$$

According to one or more embodiments, the intelligent stroke rendering system 102 utilizes the pixel loss above to provide guidance at each rendered digital drawing stroke to encourage a greedy behavior. In additional embodiments, the intelligent stroke rendering system 102 adds a perceptual loss at the last time step t=T. Additionally, $V_{ij}=\{V_{ij}^1, \ldots, V_{ij}^k\}$ and $W_{ij}=\{W_{ij}^1, \ldots, W_{ij}^k\}$ represent a set of k features vectors extracted from a digital image and digital canvas $C_T$, respectively. For example, the intelligent stroke rendering system 102 utilizes a perceptual loss as a cosine similarity between the feature vectors as:

$$\mathcal{L}_{percep} := \cos\theta = \frac{1}{K}\sum_{k}^{K}\sum_{ij}\frac{V_{ij}^k W_{ij}^k}{\|V_{ij}^k\|\|W_{ij}^k\|}$$

in which ij represents the spatial dimensions of the feature maps V and W, and K represents the extracted layers from a visual neural network. In alternative embodiments, the intelligent stroke rendering system 102 utilizes perceptual losses other than cosine similarity such as mean squared error.

In one or more embodiments, the intelligent stroke rendering system 102 determines that maximizing the perceptual loss between the final digital canvas $C_T$ and the digital image $I_i$ approximates the digital image within a threshold accuracy. By capturing the high frequency detail of the digital image utilizing the perceptual loss, the intelligent stroke rendering system 102 trains a multi-stroke neural network to capture edges and fine details. According to some embodiments, the intelligent stroke rendering system 102 sets $\lambda_1$ to 1 and $\lambda_2$ to 0.1 (for landscape images) or 0.001 (for face portrait images) due to variance of the distribution of digital images. In some embodiments, the intelligent stroke rendering system 102 also adds a fine-tuning step including 100-step optimization of the stroke parameters output by the multi-step neural network for landscape images).

In one or more embodiments, the intelligent stroke rendering system 102 utilizes an energy function with loosened constraints as:

$$\Phi_{abstraction} = \begin{cases} \sum_{t=1}^{T}\|I_i - C_t\|_1 & \text{smooth} \\ \sum_{t=1}^{T/k}\|I_i - C_t\|_1 & \text{medium} \\ \|I_i - C_T\|_1 & \text{coarse} \end{cases}$$

In some embodiments, the intelligent stroke rendering system 102 removes the perceptual loss from a baseline, resulting in $\mathcal{L}_1$ as the energy function and runs the greedy, sparse, and one-off optimizations to achieve varying levels of abstraction. According to observed experimentation, the intelligent stroke rendering system 102 is able to achieve variations of smoothness between color gradients according to different optimization schemas (e.g., with different combinations of losses/weights).

Figure 6A:
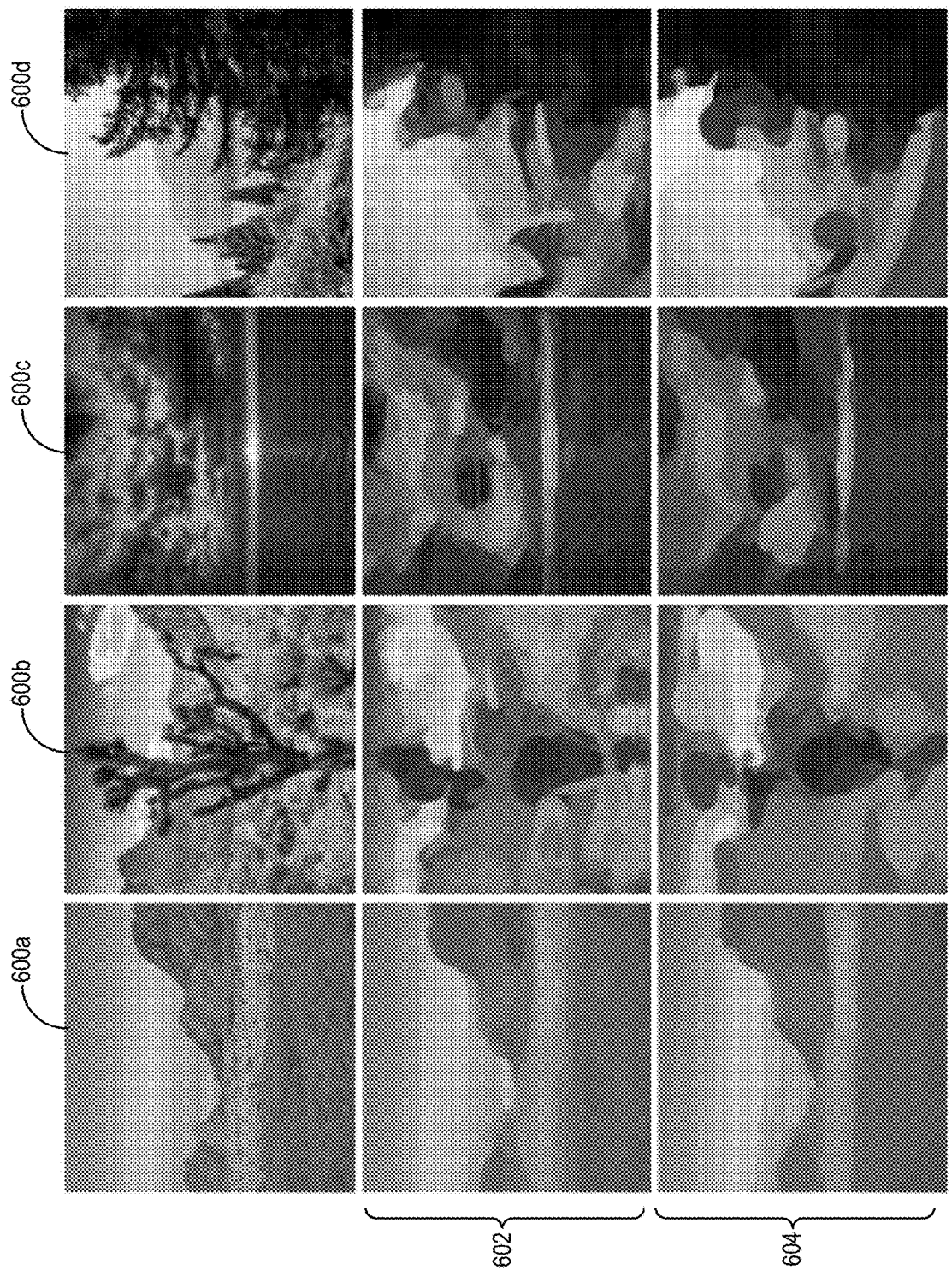
FIG. 6A illustrates digital images and reconstructed digital images utilizing the intelligent stroke rendering system in accordance with one or more implementations.

FIG. 6A illustrates that the intelligent stroke rendering system 102 processes a plurality of digital images 600a-600d to obtain a first set 602 of stylized digital images with a first optimization schema. Furthermore, the intelligent stroke rendering system 102 processes the digital images 600a-600d to obtain a second set 604 of stylized digital images with a second optimization schema. As illustrated, the different optimization schemas produce different levels of detail or abstraction using different combinations of losses and/or different numbers of digital drawing strokes.

In one or more embodiments, the intelligent stroke rendering system 102 also utilizes a stroke shape constraint to determine the shape(s) and/or size(s) of digital drawing strokes. For example, the intelligent stroke rendering system 102 utilizes a control mechanism on the stroke shape without changing stroke parameters by adding a penalization term to the energy function. To illustrate, the intelligent stroke rendering system 102 determines parameters that control the shape of a digital drawing stroke including, but not limited to, a start point, a middle point, and an end point, in addition to a radius at the start point and end point. The intelligent stroke rendering system 102 approximates the length of each stroke as the Euclidean distance between the control points:

$$S_l = \sqrt{(s_1-m_1)^2+(s_2-m_2)^2}+\sqrt{(m_1-e_1)^2+(m_2-e_2)^2}$$

where s, m, and e, represent the start point, middle point, and end point of the digital drawing stroke, respectively. Additionally, the intelligent stroke rendering system 102 approximates the width of a digital drawing stroke as $$S_w = \frac{r_s + r_e}{2}.$$

The intelligent stroke rendering system 102 also sets a shape threshold $T_s$ to penalize stroke shapes that lay on either side:

$$\mathcal{L}_{shape} = \begin{cases} 0 & \text{if } S_l < T_s \\ \|S_l - T_s\|_1 & \text{if } S_l \geq T_s \end{cases}$$

The energy function then becomes:

$$\Phi_{shapestyle} = \lambda_1\sum_{t=1}^{T}\mathcal{L}_{pixel_t} - \lambda_2\mathcal{L}_{perc} + \lambda_3\mathcal{L}_{shape}$$

By modifying the shape threshold $T_s$, the intelligent stroke rendering system 102 penalizes varying sizes and/or lengths of digital drawing strokes, thus resulting in thinner or thicker digital drawing strokes (depending on the shape threshold).

In one or more additional embodiments, the intelligent stroke rendering system 102 approximates the effect of motion dynamics on digital drawing strokes given by a limited time per individual stroke by adding a noise modifier. For example, the intelligent stroke rendering system 102 adds a Gaussian noise to the energy function. Specifically, for a vector $\vec{s}$ of brushstroke coordinates, the intelligent stroke rendering system 102 obtains the motion affected by time as $\hat{s}_z = \beta_z + \vec{s}_z$ in which $z \sim \mathcal{N}(0, 1)$ and $\beta$ represents a hyperparameter that controls the relation between precision and time per stroke. The minimization objective then becomes:

$$\Phi_{noisy} = \gamma\sum_{t=1}^{T}\mathbb{E}_{z_t \sim p_z}\{\Phi_{precise}(I_i, g(f_\Theta(I_i) + \hat{s}_{z_t}))\}$$

in which g represents a differentiable renderer neural network, $f_\Theta$ represents a learnable multi-stroke neural network, and $g(f_\Theta(I_i) + \hat{s}_{z_t}) = C_t$.

Figure 6B:
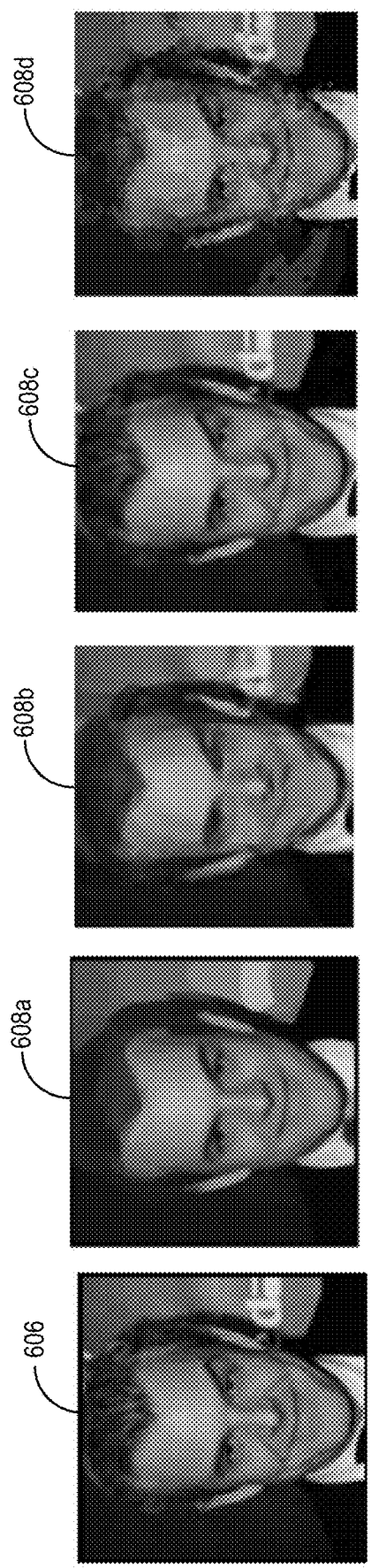
FIG. 6B illustrates a digital image and reconstructed digital images utilizing the intelligent stroke rendering system and conventional systems in accordance with one or more implementations.

According to experimental data obtained by experimenters, the intelligent stroke rendering system 102 stylized a plurality of digital images utilizing the intelligent stroke rendering system 102 and a plurality of conventional systems. FIG. 6B illustrates a digital image 606 and a plurality of stylized digital images 608a-608d utilizing a long short-term memory neural network architecture of the intelligent stroke rendering system 102 and the conventional systems. In particular, the intelligent stroke rendering system 102 generates a first stylized digital image 608a. Additionally, a first conventional system limited to 300 digital drawing strokes generates a second stylized digital image 608b and a third stylized digital image 608c via the full model. Furthermore, a second conventional system limited to 300 digital drawing strokes generates a fourth stylized digital image 608d. More specifically, the first conventional system includes a system as described by Zhewei Huang, Wen Heng, and Shuchang Zhou in "Learning to paint with model-based deep reinforcement learning" in CVPR (2019). Additionally, the second conventional system includes a system as described by Songhua Liu, Tianwei Lin, Dongliang He, Fu Li, Ruifeng Deng, Xin Li, Errui Ding, and Hao Wang in "Paint transformer: Feed forward neural painting with stroke prediction" in ICCV (2021). As illustrated, the intelligent stroke rendering system 102 produces a stylized digital image with high precision relative and improved efficiency relative to conventional systems.

Furthermore, Table 1 below includes additional experimentation details of the performance of the intelligent stroke rendering system 102 relative to conventional systems that utilize reinforcement learning, transformers, and optimization. In particular, the experiment limited the number of digital drawing strokes to match a budget of 300 digital drawing strokes. Furthermore, the table includes results for both the long short-term memory architecture ("LSTM") and the fully connected architecture ("FC"). As illustrated, the intelligent stroke rendering system 120 provides comparable or improved results over the conventional systems, particularly the long short-term memory architecture.

| Method | $\mathcal{L}_1 \downarrow$ | $\mathcal{L}_{perc} \uparrow$ |
|---|---|---|
| Reinforcement Learning | 0.036 | 0.708 |
| Transformers | 0.089 | 0.490 |
| Optimization | 0.043 | 0.631 |
| LSTM | 0.035 | 0.747 |
| FC | 0.046 | 0.735 |

Furthermore, additional experiments perform an ablation study of two different types of mapping functions: 1) a direct mapping or a projection from convolutional neural network feature maps to a sequence of strokes, and 2) a sequential mapping that includes a first projection layer to map convolutional neural network feature maps to a sequence of hidden vectors, a long short-term memory neural network decoder, and a second projection layer to map from the long short-term memory neural network hidden states to stroke parameters. The ablation study indicates that for visual abstractions, the LSTM architecture provides improved results for precise rendering styles, while the FC architecture provides comparable results for visual abstractions in stylizations.

Figure 7:
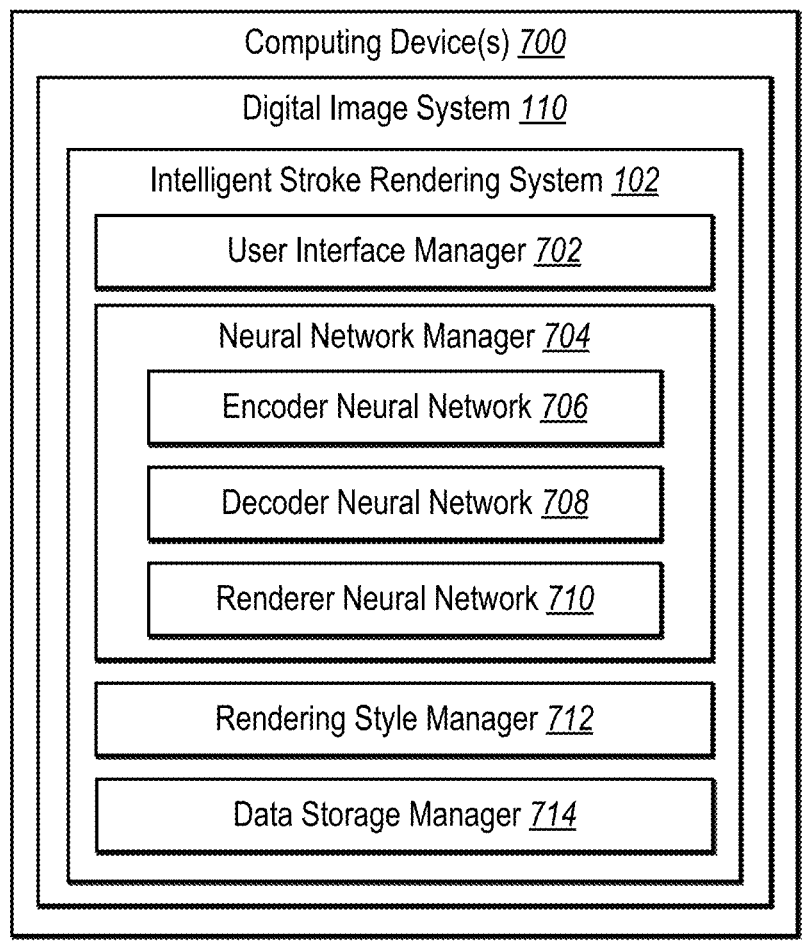
FIG. 7 illustrates a diagram of the intelligent stroke rendering system of FIG. 1 in accordance with one or more implementations.

FIG. 7 illustrates a detailed schematic diagram of an embodiment of the intelligent stroke rendering system 102 described above. As shown, the intelligent stroke rendering system 102 is implemented in a digital image system 110 on computing device(s) 700 (e.g., a client device and/or server device as described in FIG. 1, and as further described below in relation to FIG. 9). Additionally, the intelligent stroke rendering system 102 includes, but is not limited to, a user interface manager 702, a neural network manager 704 (including an encoder neural network 706, and a renderer neural network 710), a rendering style manager 712, and a data storage manager 714. The intelligent stroke rendering system 102 can be implemented on any number of computing devices. For example, the intelligent stroke rendering system 102 can be implemented in a distributed system of server devices for editing digital images. The intelligent stroke rendering system 102 can also be implemented within one or more additional systems. Alternatively, the intelligent stroke rendering system 102 can be implemented on a single computing device such as a single client device.

In one or more embodiments, each of the components of the intelligent stroke rendering system 102 is in communication with other components using any suitable communication technologies. Additionally, the components of the intelligent stroke rendering system 102 are capable of being in communication with one or more other devices including other computing devices of a user, server devices (e.g., cloud storage devices), licensing servers, or other devices/systems. It will be recognized that although the components of the intelligent stroke rendering system 102 are shown to be separate in FIG. 7, any of the subcomponents may be combined into fewer components, such as into a single component, or divided into more components as may serve a particular implementation. Furthermore, although the components of FIG. 7 are described in connection with the intelligent stroke rendering system 102, at least some of the components for performing operations in conjunction with the intelligent stroke rendering system 102 described herein may be implemented on other devices within the environment.

In some embodiments, the components of the intelligent stroke rendering system 102 include software, hardware, or both. For example, the components of the intelligent stroke rendering system 102 include one or more instructions stored on a computer-readable storage medium and executable by processors of one or more computing devices (e.g., the computing device(s) 700). When executed by the one or more processors, the computer-executable instructions of the intelligent stroke rendering system 102 cause the computing device(s) 700 to perform the operations described herein. Alternatively, the components of the intelligent stroke rendering system 102 can include hardware, such as a special purpose processing device to perform a certain function or group of functions. Additionally, or alternatively, the components of the intelligent stroke rendering system 102 can include a combination of computer-executable instructions and hardware.

Furthermore, the components of the intelligent stroke rendering system 102 performing the functions described herein with respect to the intelligent stroke rendering system 102 may, for example, be implemented as part of a stand-alone application, as a module of an application, as a plug-in for applications, as a library function or functions that may be called by other applications, and/or as a cloud-computing model. Thus, the components of the intelligent stroke rendering system 102 may be implemented as part of a stand-alone application on a personal computing device or a mobile device. Alternatively, or additionally, the components of the intelligent stroke rendering system 102 may be implemented in any application that provides digital image modification, including, but not limited to ADOBE® CREATIVE CLOUD® and ADOBE® PHOTOSHOP®.

The intelligent stroke rendering system 102 includes a user interface manager 702 to facilitate user interactions via one or more graphical user interfaces. For example, the user interface manager 702 manages user inputs to modify digital images (e.g., by stylizing the digital images). Additionally, the user interface manager 702 manages user inputs to set preferences or configurations for stylized digital images.

Additionally, the intelligent stroke rendering system 102 includes a neural network manager 704 to manage a multi-stroke neural network. For example, the neural network manager 704 manages an encoder neural network 706 for encoding features of a digital image. The neural network manager 704 also manages a decoder neural network 708 for decoding the encoded features to generate a sequence of stroke parameters. Additionally, the decoder neural network 708 includes one of a plurality of architectures (e.g., a long short-term memory neural network layer or a stack of fully connected neural network layers). The neural network manager 704 also manages a renderer neural network 710 for rendering digital drawing strokes on a digital canvas based on a sequence of stroke parameters. The neural network manager 704 also manages training of the neural networks (e.g., via a combination of losses).

The intelligent stroke rendering system 102 further includes a rendering style manager 712 to manage rendering styles for stylizing digital images. To illustrate, the rendering style manager 712 communicates with the neural network manager 704 to train neural networks according to specific rendering styles. Additionally, the rendering style manager 712 utilizes a selected rendering style (e.g., based on an input via the user interface manager 702) to select a particular multi-stroke neural network corresponding to the selected rendering style.

The intelligent stroke rendering system 102 also includes a data storage manager 714 (that comprises a non-transitory computer memory/one or more memory devices) that stores and maintains data associated with digital images. For example, the data storage manager 714 stores data associated with digital images and neural networks associated with stylizing the digital images. To illustrate, the data storage manager 714 stores feature encodings, stroke parameter sequences, and digital canvas instances including digital drawing strokes.

Figure 8:
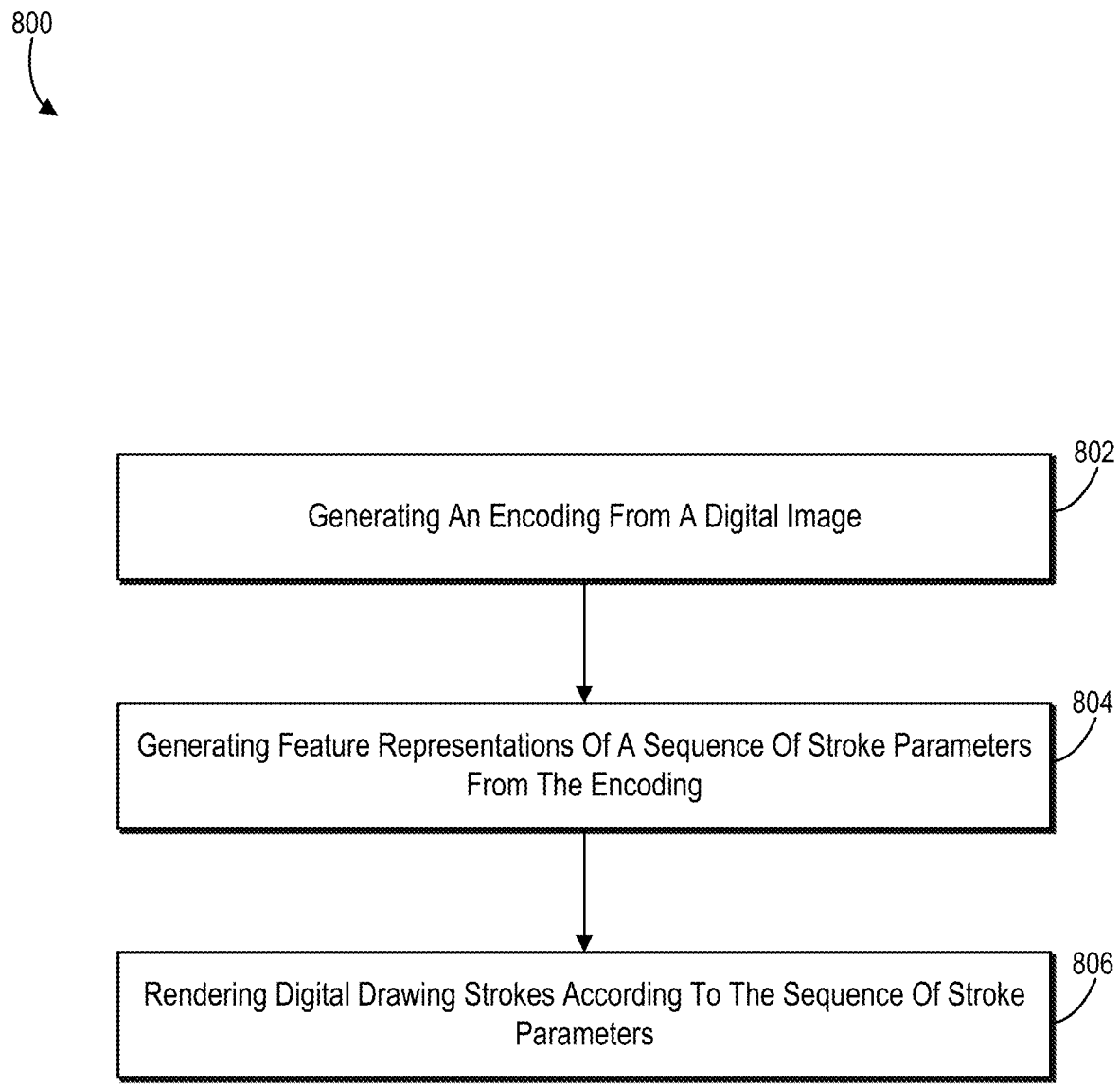
FIG. 8 illustrates a flowchart of a series of acts for reconstructing a digital image on a digital canvas utilizing a multi-stroke neural network in accordance with one or more implementations.

Turning now to FIG. 8, this figure shows a flowchart of a series of acts 800 of stylizing a digital image utilizing a sequence of stroke parameters generated via a single pass of a multi-stroke neural network. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of generating an encoding from a digital image. For example, act 802 involves generating, utilizing an encoder neural network, an encoding comprising feature maps from a digital image. Act 802 can involve utilizing an encoder neural network including a plurality of convolutional neural network layers to generate the encoding comprising the feature maps. Additionally, act 802 can involve downsampling the digital image while generating the encoding comprising the feature maps.

Additionally, the series of acts 800 includes an act 804 of generating feature representations of a sequence of stroke parameters from the encoding. For example, act 804 involves generating, utilizing a decoder neural network, a plurality of feature representations corresponding to a sequence of stroke parameters for a plurality of digital drawing strokes from the encoding comprising the feature maps. Act 804 can involve generating, via the single pass of the decoder neural network from the encoding comprising the feature maps, the plurality of feature representations comprising information indicating stroke widths, stroke colors, and stroke positions of the plurality of digital drawing strokes.

Act 804 can involve generating the plurality of feature representations in a single pass of the encoding via the decoder neural network. Act 804 can also involve generating a vector comprising the feature representations according to a number and an order of stroke parameters for the plurality of digital drawing strokes. For example, act 804 can involve generating a vector comprising the feature representations according to a number of digital drawing strokes for the sequence of stroke parameters for the plurality of digital drawing strokes. To illustrate, act 804 can involve generating the vector comprising a first feature representation for one or more first stroke parameters and a second feature representation for one or more second stroke parameters ordered after the first feature representation.

In one or more embodiments, act 804 involves generating, via a single pass of the decoder neural network having the stack of fully-connected neural network layers, a plurality of feature representations corresponding to a sequence of stroke parameters for a plurality of digital drawing strokes from the encoding comprising the feature maps.

In one or more additional embodiments, act 804 involves generating, via a single pass of a decoder neural network comprising a long short-term memory neural network layer, a plurality of feature representations corresponding to a sequence of stroke parameters for a plurality of digital drawing strokes from the encoding comprising the feature maps.

The series of acts 800 also includes an act 806 of rendering digital drawing strokes according to the sequence of stroke parameters. For example, act 806 involves rendering, utilizing a differentiable renderer neural network, the plurality of digital drawing strokes within a digital canvas corresponding to the digital image according to the sequence of stroke parameters.

Act 806 can involve rendering the plurality of digital drawing strokes according to the stroke widths, the stroke colors, and the stroke positions of the plurality of digital drawings strokes from the plurality of feature representations. For example, act 806 can involve rendering, within a first instance of the digital canvas, a first digital drawing stroke of the plurality of digital drawing strokes according to a first stroke width, a first stroke color, and a first stroke position based on a feature representation corresponding to the first digital drawing stroke. Act 806 can then involve rendering, within a second instance of the digital canvas, a second digital drawing stroke of the plurality of digital drawing strokes according to a second stroke width, a second stroke color, and a second stroke position based on a feature representation corresponding to the second digital drawing stroke, the second instance of the digital canvas comprising the first digital drawing stroke and the second digital drawing stroke.

Act 806 can involve rendering the plurality of digital drawing strokes according to the number and the order of the stroke parameters from the vector comprising the feature representations. To illustrate, act 806 can involve rendering the plurality of digital drawing strokes according to the vector comprising the feature representations. For example, act 806 can involve rendering, within the digital canvas, a first digital drawing stroke corresponding to one or more first stroke parameters from the vector. Act 806 can also involve rendering, within the digital canvas, a second digital drawing stroke corresponding to one or more second stroke parameters from the vector after rendering the first digital drawing stroke according to the order of the stroke parameters from the vector.

According to one or more embodiments, the series of acts 800 also includes determining a loss based on a plurality of differences between the digital image and a plurality of instances of the digital canvas corresponding to rendering the plurality of digital drawing strokes within the digital canvas. The series of acts 800 can then include modifying parameters of one or more of the encoder neural network or the decoder neural network based on the loss.

The series of acts 800 also can include determining a loss based on a difference between the digital image and a final instance of the digital canvas after rendering the plurality of digital drawing strokes within the digital canvas. The series of acts 800 can then include modifying parameters of one or more of the encoder neural network or the decoder neural network based on the difference.

Additionally, the series of acts 800 can include determining a loss based on a difference between the digital image and an intermediate instance of the digital canvas after rendering a subset of the plurality of digital drawing strokes within the digital canvas. The series of acts 800 can also include modifying parameters of one or more of the encoder neural network or the decoder neural network based on the loss.

In some embodiments, the series of acts 800 includes determining a plurality of losses based on a plurality of differences between the digital image and a plurality of instances of the digital canvas based on rendering the plurality of digital drawing strokes within the digital canvas. The series of acts 800 can then include determining a plurality of weights for the plurality of losses in connection with a rendering style for rendering the plurality of digital drawing strokes within the digital canvas. Furthermore, the series of acts 800 can include modifying parameters of the encoder neural network and the decoder neural network utilizing backpropagation of the plurality of losses according to the weights of the plurality of losses.

Additionally, the series of acts 800 can include determining one or more losses based on differences between the digital image and one or more instances of the digital canvas corresponding to rendering one or more digital drawing strokes within the digital canvas based on the plurality of feature representations. The series of acts 800 can also include determining one or more weights of the one or more losses according to a rendering style for rendering the plurality of digital drawing strokes within the digital canvas. The series of acts 800 can further include modifying parameters of the encoder neural network or the decoder neural network according to the one or more weights of one or more plurality of losses.

The series of acts 800 can include generating a plurality of instances of the decoder neural network corresponding to a plurality of rendering styles. The series of acts 800 can further include generating the plurality of feature representations utilizing an instance of the decoder neural network corresponding to a selected rendering style.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
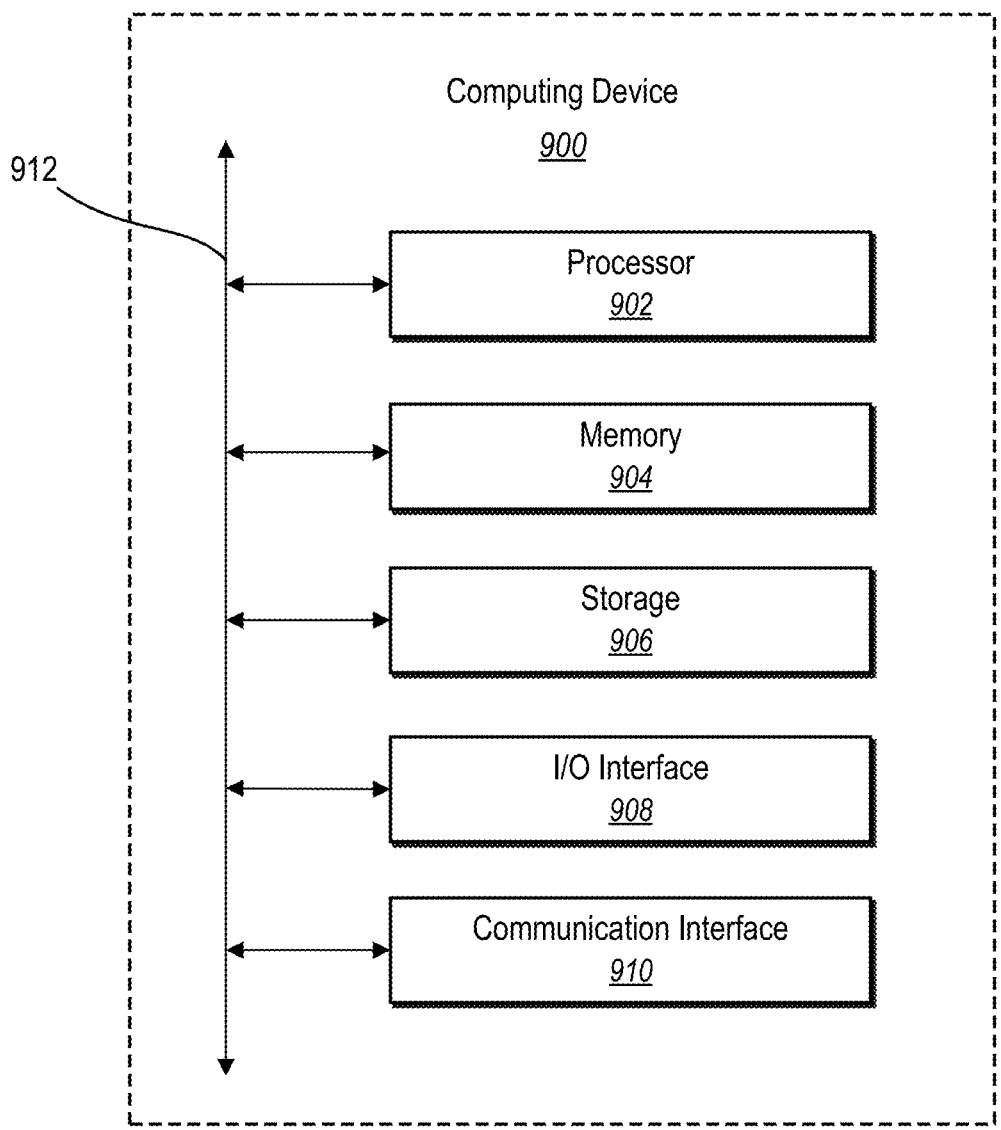
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
generating, utilizing an encoder neural network, an encoding comprising feature maps from a digital image;
determining, based on a user input via a graphical user interface of a client device, a selection of a particular rendering style for rendering digital drawing strokes;
generating, from the encoding comprising the feature maps utilizing a decoder neural network trained to generate stroke parameters according to the particular rendering style, a plurality of feature representations that define a sequence of stroke parameters for a plurality of digital drawing strokes; and
sequentially rendering the plurality of digital drawing strokes within a digital canvas according to the sequence of stroke parameters by utilizing a differentiable renderer neural network to sequentially convert the plurality of feature representations into the plurality of digital drawing strokes on a plurality of sequential instances of the digital canvas.

2. The method as recited in claim 1, wherein generating the plurality of feature representations comprises generating the plurality of feature representations in a single pass of the encoding via the decoder neural network.

3. The method as recited in claim 1, wherein generating the plurality of feature representations comprises generating a vector comprising the plurality of feature representations according to a number and an order of stroke parameters for the plurality of digital drawing strokes.

4. The method as recited in claim 3, wherein sequentially rendering the plurality of digital drawing strokes comprises rendering the plurality of digital drawing strokes according to the number and the order of the stroke parameters from the vector comprising the plurality of feature representations.

5. The method as recited in claim 1, wherein sequentially rendering the plurality of digital drawing strokes comprises:
converting a first feature representation of the plurality of feature representations into a first digital drawing stroke on a first instance of the digital canvas; and
converting a second feature representation of the plurality of feature representations into a second digital drawing stroke on a second instance of the digital canvas, the second instance of the digital canvas comprising the first digital drawing stroke and the second digital drawing stroke.

6. The method as recited in claim 1, further comprising:
determining a loss based on a plurality of differences between the digital image and a plurality of instances of the digital canvas corresponding to rendering the plurality of digital drawing strokes within the digital canvas; and
modifying parameters of one or more of the encoder neural network or the decoder neural network based on the loss.

7. The method as recited in claim 1, further comprising:
determining a loss based on a difference between the digital image and a final instance of the digital canvas after rendering the plurality of digital drawing strokes within the digital canvas; and
modifying parameters of one or more of the encoder neural network or the decoder neural network based on the difference.

8. The method as recited in claim 1, further comprising:
determining, from a plurality of instances of the decoder neural network corresponding to a plurality of rendering styles, an instance of the decoder neural network for the particular rendering style of the selection from the user input.

9. The method as recited in claim 1, further comprising:
determining a first loss based on a plurality of differences between the digital image and a plurality of instances of the digital canvas based on rendering the plurality of digital drawing strokes within the digital canvas;
determining a second loss based on a difference between the digital image and a final instance of the digital canvas after rendering the plurality of digital drawing strokes within the digital canvas;
determining a third loss based on a difference between the digital image and an intermediate instance of the digital canvas after rendering a subset of the plurality of digital drawing strokes within the digital canvas;
determining a plurality of weights for the first loss, the second loss, and the third loss in connection with a rendering style for rendering the plurality of digital drawing strokes within the digital canvas; and
modifying parameters of one or more of the encoder neural network or the decoder neural network based on the first loss, the second loss, and the third loss weighted according to the plurality of weights.

10. A system comprising:
one or more computer memory devices comprising a digital image, an encoder neural network, a decoder neural network having a stack of fully-connected neural network layers and trained to generate stroke parameters according to a particular rendering style, and a differentiable renderer neural network; and
one or more processors configured to cause the system to:
generate, utilizing the encoder neural network, an encoding comprising feature maps from the digital image;
determine, based on a user input via a graphical user interface of a client device, a selection of the particular rendering style for rendering digital drawing strokes;
generate, from the encoding comprising the feature maps via a single pass of the decoder neural network having the stack of fully-connected neural network layers, a plurality of feature representations that define a sequence of stroke parameters for a plurality of digital drawing strokes; and
sequentially render the plurality of digital drawing strokes within a digital canvas according to the sequence of stroke parameters by utilizing the differentiable renderer neural network to sequentially convert the plurality of feature representations into the plurality of digital drawing strokes on a plurality of sequential instances of the digital canvas.

11. The system as recited in claim 10, wherein the one or more processors are further configured to:
generate a vector comprising the plurality of feature representations according to a number of digital drawing strokes for the sequence of stroke parameters for the plurality of digital drawing strokes; and
render the plurality of digital drawing strokes according to the vector comprising the plurality of feature representations.

12. The system as recited in claim 11, wherein the one or more processors are further configured to:
generate the vector comprising a first feature representation for one or more first stroke parameters and a second feature representation for one or more second stroke parameters ordered after the first feature representation;
render a first digital drawing stroke within the digital canvas according to the one or more first stroke parameters; and
render a second digital drawing stroke within the digital canvas according to the one or more second stroke parameters after rendering the first digital drawing stroke.

13. The system as recited in claim 10, wherein the one or more processors are further configured to:
determine a plurality of losses based on differences between the digital image and instances of the digital canvas corresponding to rendering a plurality of digital drawing strokes within the digital canvas;
determine weights of the plurality of losses according to a rendering style for rendering the plurality of digital drawing strokes within the digital canvas; and
modify parameters of the encoder neural network and the decoder neural network utilizing backpropagation of the plurality of losses according to the weights of the plurality of losses.

14. The system as recited in claim 13, wherein the one or more processors are further configured to:
generate a plurality of instances of the decoder neural network corresponding to a plurality of rendering styles; and
generate the plurality of feature representations utilizing an instance of the decoder neural network corresponding to a selected rendering style.

15. The system as recited in claim 13, wherein the one or more processors are further configured to determine the plurality of losses by:
determining a first loss based on a plurality of differences between the digital image and a first plurality of instances of the digital canvas corresponding to rendering a plurality of digital drawing strokes of the plurality of digital drawing strokes within the digital canvas;
determining a second loss based on a difference between the digital image and a final instance of the digital canvas after rendering the plurality of digital drawing strokes within the digital canvas; and
determining a third loss based on a difference between the digital image and an intermediate instance of the digital canvas after rendering a subset of the plurality of digital drawing strokes within the digital canvas.

16. A non-transitory computer readable storage medium comprising instructions that, when executed by at least one processor, cause a computing device to:
generate, utilizing an encoder neural network, an encoding comprising feature maps from a digital image;
determine, based on a user input via a graphical user interface of a client device, a selection of a particular rendering style for rendering digital drawing strokes;
generate, from the encoding comprising the feature maps via a single pass of a decoder neural network comprising a long short-term memory neural network layer and trained to generate stroke parameters according to the particular rendering style, a plurality of feature representations that define a sequence of stroke parameters for a plurality of digital drawing strokes; and
sequentially render the plurality of digital drawing strokes within a digital canvas according to the sequence of stroke parameters by sequentially converting the plurality of feature representations into the plurality of digital drawing strokes on a plurality of sequential instances of the digital canvas.

17. The non-transitory computer readable storage medium as recited in claim 16, further comprising instructions that, when executed by the at least one processor, cause the computing device to generate, via the single pass of the decoder neural network from the encoding comprising the feature maps, the plurality of feature representations comprising information indicating stroke widths, stroke colors, and stroke positions of the plurality of digital drawing strokes.

18. The non-transitory computer readable storage medium as recited in claim 17, further comprising instructions that, when executed by the at least one processor, cause the computing device to render the plurality of digital drawing strokes according to the stroke widths, the stroke colors, and the stroke positions of the plurality of digital drawing strokes from the plurality of feature representations.

19. The non-transitory computer readable storage medium as recited in claim 18, further comprising instructions that, when executed by the at least one processor, cause the computing device to:
render, within a first instance of the digital canvas, a first digital drawing stroke of the plurality of digital drawing strokes according to a first stroke width, a first stroke color, and a first stroke position based on a feature representation corresponding to the first digital drawing stroke; and
render, within a second instance of the digital canvas, a second digital drawing stroke of the plurality of digital drawing strokes according to a second stroke width, a second stroke color, and a second stroke position based on a feature representation corresponding to the second digital drawing stroke, the second instance of the digital canvas comprising the first digital drawing stroke and the second digital drawing stroke.

20. The non-transitory computer readable storage medium as recited in claim 16, further comprising instructions that, when executed by the at least one processor, cause the computing device to:
determine one or more losses based on differences between the digital image and one or more instances of the digital canvas corresponding to rendering one or more digital drawing strokes within the digital canvas based on the plurality of feature representations;
determine one or more weights of the one or more losses according to a rendering style for rendering the plurality of digital drawing strokes within the digital canvas; and modify parameters of the encoder neural network or the decoder neural network according to the one or more weights of the one or more losses.

* * * * *